United States Patent
Kuroyanagi

(10) Patent No.: US 6,597,469 B1
(45) Date of Patent: Jul. 22, 2003

(54) IMAGE FORMING SYSTEM, MANAGEMENT METHOD OF NUMBER OF OUTPUTS FROM IMAGE FORMING SYSTEM, AND MEDIUM STORING PROGRAM FOR EXECUTING THE METHOD

(75) Inventor: Satoshi Kuroyanagi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/222,847

(22) Filed: Dec. 30, 1998

(30) Foreign Application Priority Data

Jan. 8, 1998 (JP) .......................... 10-013151
Jan. 16, 1998 (JP) .......................... 10-006787

(51) Int. Cl.⁷ .......................... G06F 15/00; G06F 9/00; G06K 5/00; G06K 7/10
(52) U.S. Cl. .................... 358/1.15; 358/1.15; 358/1.18; 358/1.13; 358/1.14; 709/104.1; 235/380; 235/382; 235/462
(58) Field of Search ............................... 358/1.15, 709; 709/104.1

(56) References Cited

U.S. PATENT DOCUMENTS

| | | | | |
|---|---|---|---|---|
| 5,659,628 A | * | 8/1997 | Tachikawa et al. | 382/135 |
| 5,880,447 A | * | 3/1999 | Okada et al. | 235/380 |
| 5,897,643 A | * | 4/1999 | Matsumoto | 707/511 |
| 2002/0048035 A1 | * | 4/2002 | Beaudet et al. | 358/1.9 |

* cited by examiner

Primary Examiner—Edward Coles
Assistant Examiner—Saeid Ebrahimi
(74) Attorney, Agent, or Firm—Fitzpatrick, Cella, Harper & Scinto

(57) ABSTRACT

An image forming system having a print server for using a composite function image forming apparatus having a composite function of outputting a print job and a copy job, as a common output apparatus for print jobs requested by client users on a network and received from the network. The composite function image forming apparatus has a copy job output number management function of receiving a copy job requested by each client user assigned a specific copy job management identification number, outputting the received copy job, and managing the number of copy outputs of the copy job in correspondence with the copy job management identification number. The print server has a print job output number management function of receiving from the network a print job requested by each client user assigned a specific print job management identification number, instructing the composite function image forming apparatus to print out the received print job, and managing the number of print outputs of the print job in correspondence with the print job management identification number. A totalling apparatus is provided on the network. The totalling apparatus has a memory for storing user data in a correspondence format of the copy job management identification number and the print job management identification number, and a user discriminating unit for discriminating between client users each having a specific copy job management identification number and a specific print job management identification number by referring to the user data stored in the memory, wherein the totalling apparatus fetches via the network the output number managed by the copy job output number management function of the composite function image forming apparatus in correspondence with the copy job management identification number and the output number managed by the print job output number management function of the print server in correspondence with the print job management identification number, and totals the output number of copy jobs and the output number of print jobs for each client user in accordance with a discrimination result by the user discriminating unit.

28 Claims, 11 Drawing Sheets

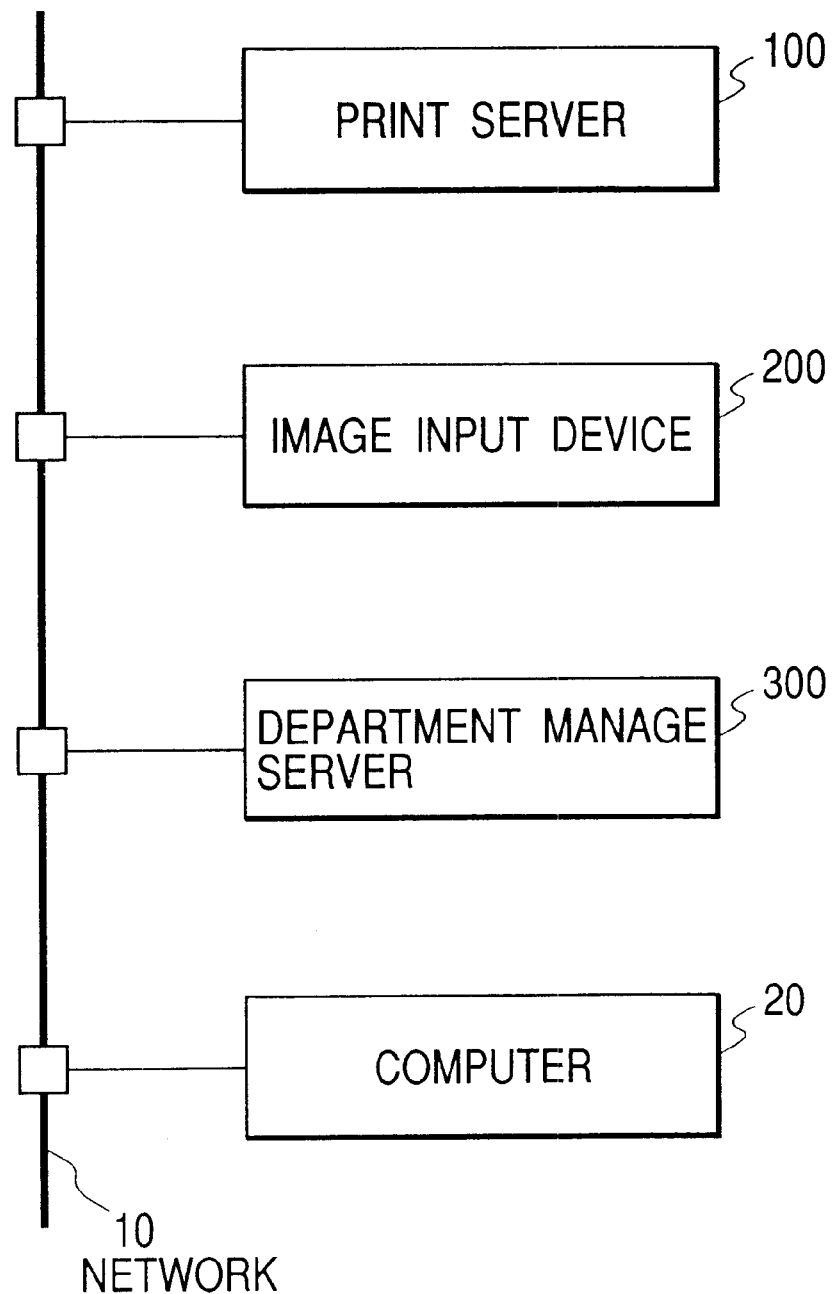

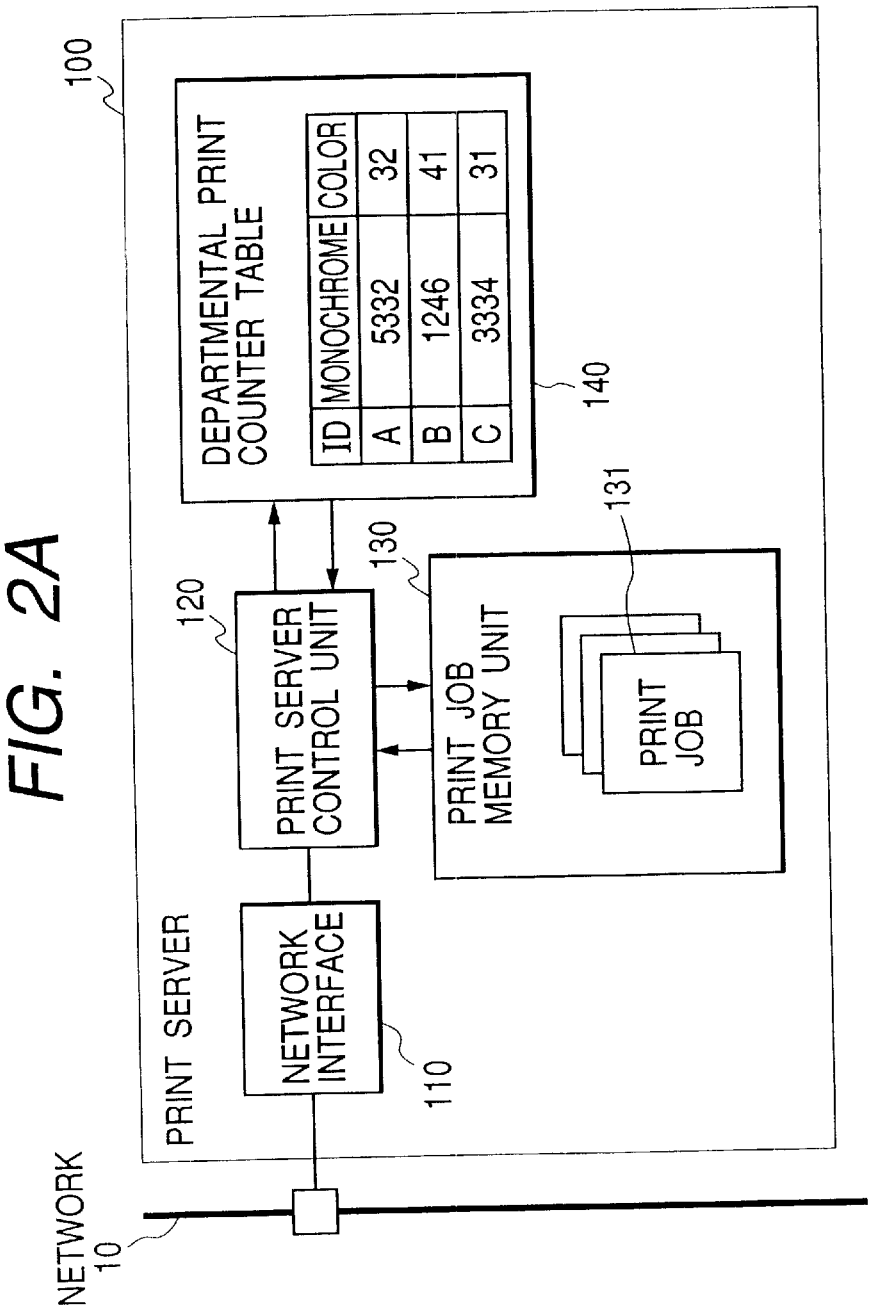

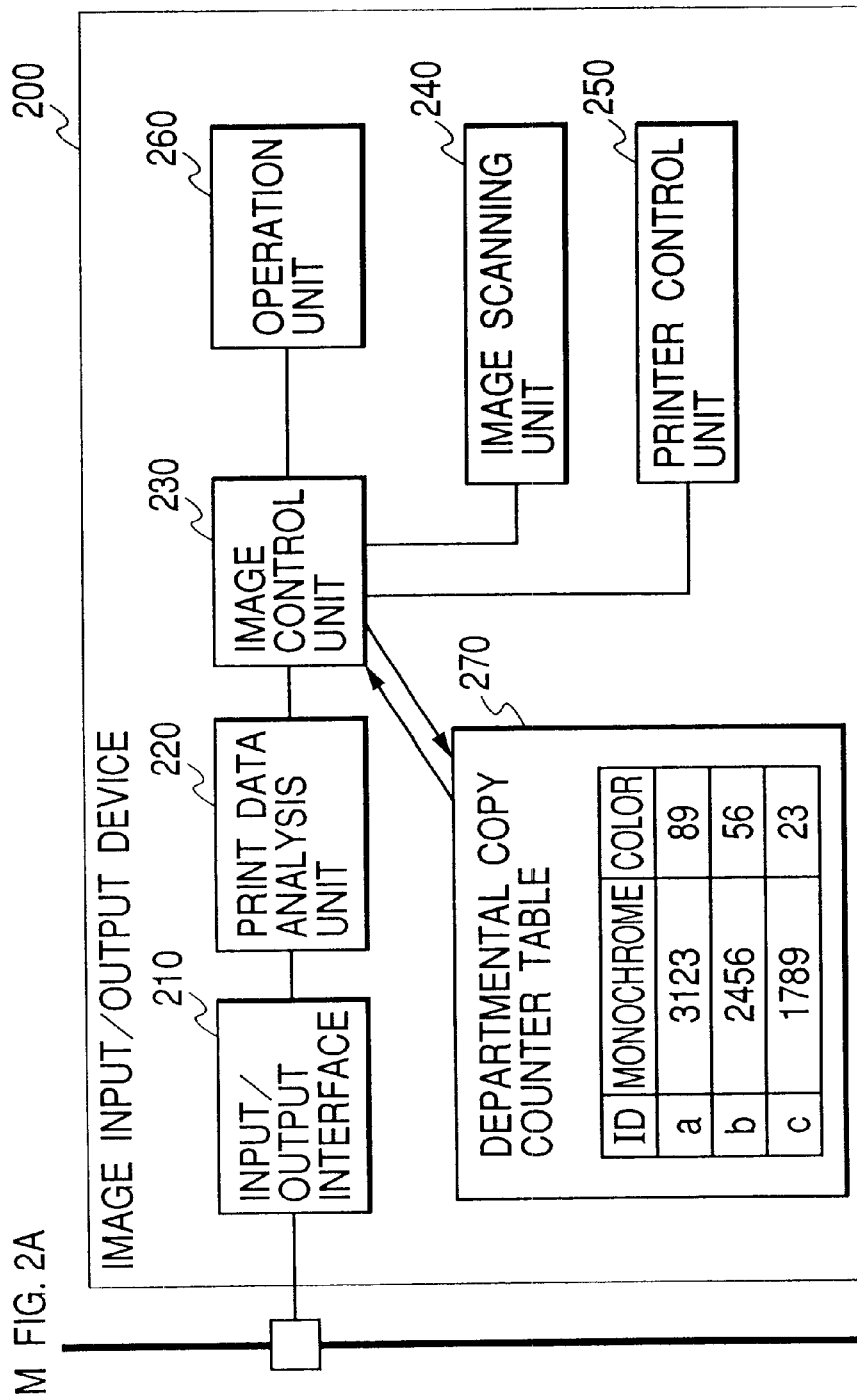

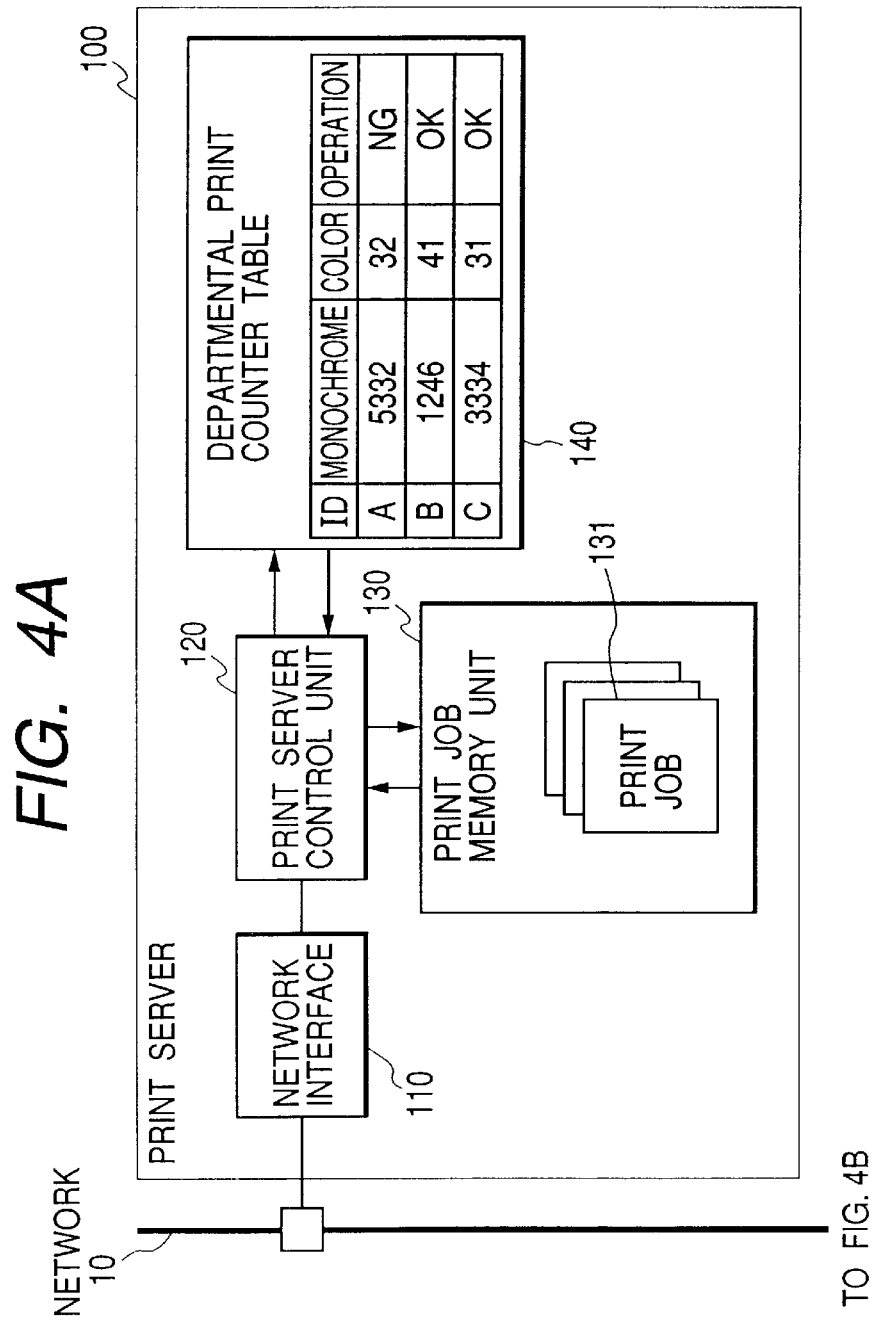

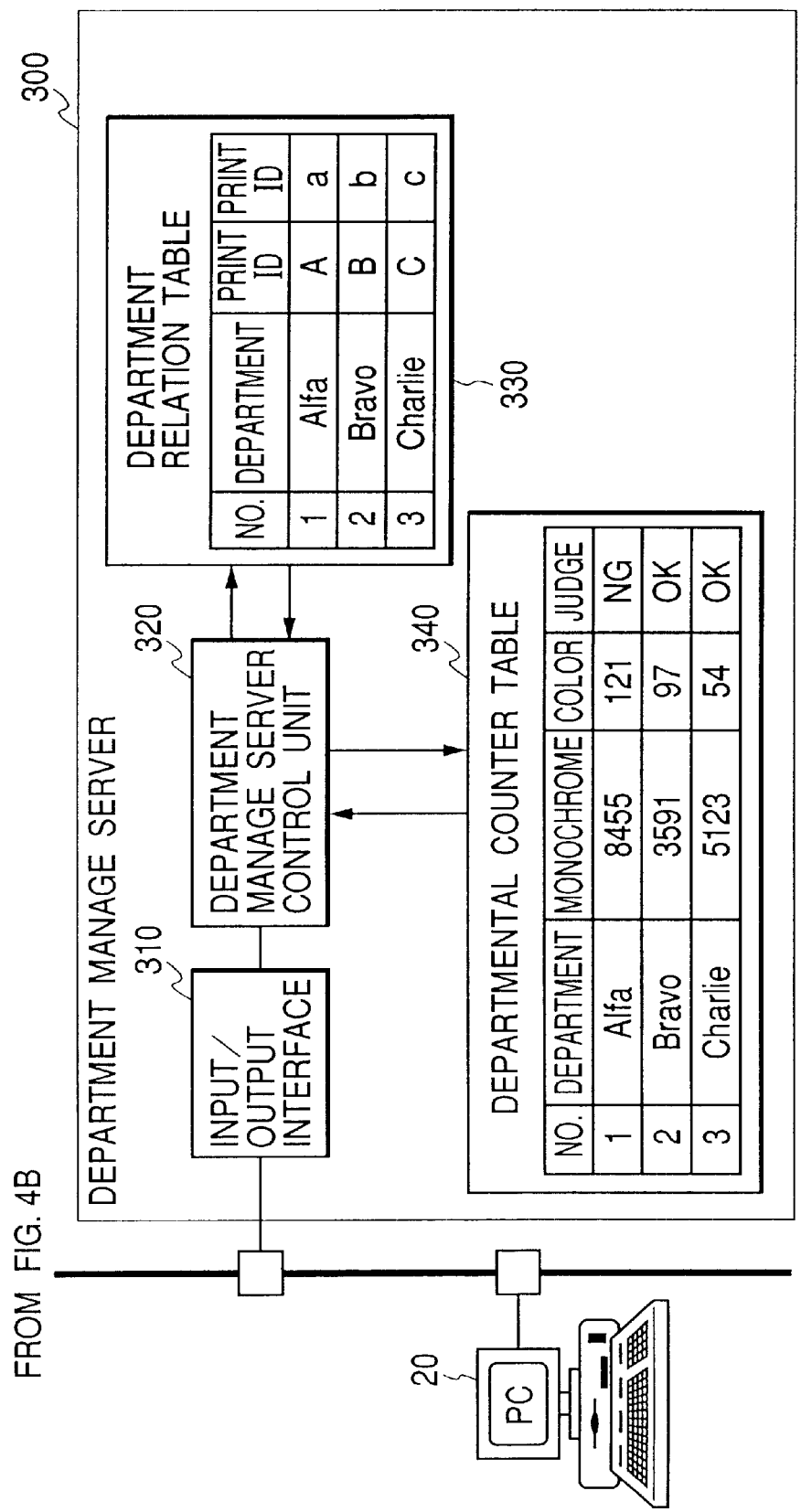

FIG. 7

MEMORY MEDIUM
e.g. FD/CD-ROM etc.

| DIRECTORY INFORMATION |
|---|
| FIRST DATA PROCESSING PROGRAM PROGRAM CODES CORRESPONDING TO THE FLOW CHART OF FIGS. 5 AND 6 |
| |

MEMORY MEDIUM MAP

IMAGE FORMING SYSTEM, MANAGEMENT METHOD OF NUMBER OF OUTPUTS FROM IMAGE FORMING SYSTEM, AND MEDIUM STORING PROGRAM FOR EXECUTING THE METHOD

BACKGROUND OF THE INVENTION

1. Field of the Invention

The present invention relates to an image forming system having a print server for using a composite function image forming apparatus having a composite function of outputting a print job and a copy job, as a common output apparatus for print jobs requested by client users on a network and received from the network, to an output number managing method, and to a storage medium storing programs for executing such a method.

2. Related Background Art

A copier having a password mode function is known in which a user is permitted to perform a copy job if an entered password specific to the user is coincident with an already registered password. In this password mode, the numbers of copy outputs for permitted copy jobs are counted and the cumulative number of copy outputs is managed in correspondence with each password. The cumulative number of copy outputs managed in this password mode is used for calculating a use charge of the copier and the like.

Recent advancement of multi-function and networking of a copier has lead the advent of a composite function apparatus added with a printer mode and being connectable to a network to allow the copier to be used as a common printer of clients on the network. The print mode of this composite function copier is not provided with the password mode described above in which the number of print outputs of a print job requested by each client is managed in correspondence with the client.

In order to manage the number of print outputs of a print job requested by each client, the following management method has been used heretofore. Specifically, a network is provided with a print server which receives from the network a print job requested by each client assigned beforehand a specific print job management number. The print server instructs the composite function apparatus to output the received print job, and the print server itself manages the number of print outputs of the print job in correspondence with the client print job management number.

In this network using the composite function apparatus as a common printer of clients, however, the number of copy outputs of a copy job in the copy mode is managed in correspondence with each client on the side of the composite function apparatus, whereas the number of print outputs of a print job in the print mode is managed in correspondence with each client on the side of the print server. Therefore, the numbers of print and copy outputs of the print and copy jobs requested by the same user are not managed collectively, and it takes a very long labor to calculate sums of the numbers of print and copy outputs of the print and copy jobs requested by the same user and then calculate a use charge of each user and the like.

Other functions can be set to each composite function copier, such as a function of inhibiting a copy job when the number of copy outputs exceeds a predetermined limit number set to the copier, even if the entered password is coincident with the already registered one.

However, since this function is set to each copier independently, a user can change the copier whose predetermined limit number being exceeded by the number of copy outputs to another copier still not used by the user. Therefore, the total number of copy outputs limited to each user cannot be set.

In managing the number of print outputs of each user output from a digital composite function copier connected to a network and being capable of processing each print request, the number of print outputs is not counted in correspondence with each password of the digital composite function copier, but the print server identifies the user from user output data and counts the number of print outputs in correspondence with not the password but another classification.

In managing the number of outputs, a conventional copier is provided with a counter for each department to count the number of outputs at each department. The number of outputs can be limited only in correspondence with each department. The total number of outputs by all copiers cannot be limited, and the total number of outputs by all departments cannot be limited.

In a digital composite function copier, the number of copy outputs by the copy function is counted by the digital composite function copier, whereas the number of print outputs by the print function is counted by the print server. Since different count means are used, it is not possible to limit the use of the copy or print function in accordance with the total number of print and copy outputs.

SUMMARY OF THE INVENTION

It is an object of the present invention to provide an image forming system and an output number management method for the image forming system capable of collectively managing the number of outputs of the print and copy jobs in correspondence with each user, and a storage medium storing programs for executing such a method.

According to one embodiment of the invention, an image forming system having a print server for using a composite function image forming apparatus having a composite function of outputting a print job and a copy job, as a common output apparatus for print jobs requested by client users on a network and received from the network, is provided wherein: the composite function image forming apparatus has a copy job output number management function of receiving a copy job requested by each client user assigned a specific copy job management identification number, outputting the received copy job, and managing the number of copy outputs of the copy job in correspondence with the copy job management identification number; the print server has a print job output number management function of receiving from the network a print job requested by each client user assigned a specific print job management identification number, instructing the composite function image forming apparatus to print out the received print job, and managing the number of print outputs of the print job in correspondence with the print job management identification number; and a totalling apparatus is provided on the network, the totalling apparatus comprising: storage means for storing user data in a correspondence format of the copy job management identification number and the print job management identification number; and user discriminating means for discriminating between client users each having a specific copy job management identification number and a specific print job management identification number by referring to the user data stored in the storage means, wherein the totalling apparatus fetches via the network the output number managed by the copy job output number management function of the composite function image forming apparatus in correspondence with the copy job management identification number and the output number managed by the print job output number management function of the print server in correspondence with the print job management identification number, and totals the output number of copy jobs and the output number of print jobs for each client user in accordance with a discrimination result by the user discriminating means.

According to another embodiment of the invention, an output number management method of managing an output number of a print job and an output number of a copy job for an image forming system having a print server for using a composite function image forming apparatus having a composite function of outputting a print job and a copy job, as a common output apparatus for print jobs requested by client users on a network and received from the network, is provided wherein: a totalling apparatus is provided on the network, the composite function image forming apparatus receives a copy job requested by each client user assigned a specific copy job management identification number, outputs the received copy job, and manages the number of copy outputs of the copy job in correspondence with the copy job management identification number; the print server receives from the network a print job requested by each client user assigned a specific print job management identification number, instructs the composite function image forming apparatus to print out the received print job, and manages the number of print outputs of the print job in correspondence with the print job management identification number; and the totalling apparatus stores in storage means user data in a correspondence format of the copy job management identification number and the print job management identification number, discriminates between client users each having a specific copy job management identification number and a specific print job management identification number by referring to the user data stored in the storage means, wherein the totalling apparatus fetches via the network the output number managed by the composite function image forming apparatus in correspondence with the copy job management identification number and the output number managed by the print server in correspondence with the print job management identification number, and totals the output number of copy jobs and the output number of print jobs for each client user in accordance with a discrimination result.

According to another embodiment of the invention, a storage medium storing a program for configuring on an image forming system an output number management system for managing an output number of a print job and an output number of a copy job, the image forming system including a composite function image forming apparatus with a composite function of outputting the print job and the copy job and a print server, the composite function image forming apparatus having a copy job output number management function of receiving a copy job requested by each client user assigned a specific copy job management identification number, outputting the received copy job, and managing the number of copy outputs of the copy job in correspondence with the copy job management identification number, the print server having a print job output number management function of receiving from the network a print job requested by each client user assigned a specific print job management identification number, instructing the composite function image forming apparatus to print out the received print job, and managing the number of print outputs of the print job in correspondence with the print job management identification number, is provided, the program being executable by an information processing apparatus provided on the network and comprising: a storage module for storing user data in a correspondence format of the copy job management identification number and the print job management identification number; a user discriminating module for discriminating between client users each having a specific copy job management identification number and a specific print job management identification number by referring to the user data stored in the storage module; a fetch control module for controlling to fetch via the network the output number managed by the copy job output number management function of the composite function image forming apparatus in correspondence with the copy job management identification number and the output number managed by the print job output number management function of the print server in correspondence with the print job management identification number; and a totalling module for totalling the output number of copy jobs and the output number of print jobs for each client user in accordance with a discrimination result by the user discriminating module.

It is another object of the present invention to provide an image processing system, a data management method for the image processing system, and a storage medium storing a program readable by a computer which controls the image processing system. The image processing system can configure a desired network environment which can reliably inhibit a print or copy job requested by a user having the output number in excess of a limit output number. In this image processing system, an output print number and an output copy number managed for each identified user are collected from a print server and an image input/output server and totalled to thereby manage the output numbers from the total sum. If the total sum is larger than a preset limit value of each user, an inhibition request for inhibiting an execution of the print or copy job is transmitted from a second server to the print server or image input/output device. In accordance with the inhibition request supplied from the second server, a permission state of print or copy job inhibition information stored in first or second memory is changed to an inhibition state, irrespective of whether or not a user has a small print output number and a large copy output number or vice versa.

According to an embodiment of the invention, an image processing system is provided which comprises: a first server for storing and managing a print job requested by a client and received via a predetermined communication medium; an image input/output device having a printer unit for receiving the print job stored in the first server via the predetermined communication medium and outputting image data or outputting image data supplied from a reader unit; and a second server for totalling and managing a print output number of the first server and a copy output number of the image input/output device through communications with the first server and the image input/output device via the predetermined communication medium, and inhibiting a use of the first server and the image input/output device in accordance with a total sum obtained through totalling by the second server.

According to an embodiment of the invention, an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided wherein: the first server comprises: first storage means for storing first identification information for identifying a client requested a print job, an output print number designated by the print job, and print job permission information for determining a permission or inhibition of executing the print job; first count means for counting the output print number each time a print job requested by each client identified by the first identification information is executed; first inhibition means for inhibiting a transmission of a print job requested by each client in accordance with the print job permission information stored in the first storage means; first transmission means, responsive to a request for the output print number from the second server, for transmitting the output print number for each piece of the first identification information stored in the first storage means; and print control means for changing a permission state of the print job permission information stored in the first storage means to an inhibition state of the permission information, in accordance with an inhibition request received from the second server; the image input/output device comprises: second storage means for storing second identification information for identifying a client requested a copy job by the reader unit and the printer unit, an output copy number designated, and copy job permission information for determining a permission or inhibition of executing the copy job; second count means for counting the output copy number each time a copy job requested by each client identified by the second identification information is executed; second inhibition means for inhibiting a copy job requested by each client in accordance with the copy job permission information stored in the second storage means; second transmission means, responsive to a request for the output copy number from the second server, for transmitting the output copy number for each piece of the second identification information stored in the second storage means; and copy control means for changing a permission state of the copy job permission information stored in the second storage means to an inhibition state of the copy job permission information, in accordance with an inhibition request received from the second server; and the second server comprises: third storage means for storing correspondence information of the first identification information supplied from the first server and the second identification information supplied from the image input/output device; request means for requesting to fetch the output print number from the first server and the output copy number from the image input/output device; fourth storage means for totalling and storing for each piece of the identification information, the output print number supplied from the first server and the output copy number supplied from the image input/output device in response to the request by the request means; and notifying means for notifying the first server and the image input/output device of an inhibition request for inhibiting the print job and the copy job, in accordance with a limit output number set for each piece of the identification information and stored in the fourth storage means.

According to an embodiment of the invention, a data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided which comprises: a first storing step of storing in a first memory first identification information for identifying a client requested a print job, an output print number designated by the print job, and print job permission information for determining a permission or inhibition of executing the print job; a first counting step of counting the output print number each time a print job requested by each client identified by the first identification information is executed; a first inhibiting step of inhibiting a transmission of a print job requested by each client in accordance with the print job permission information stored in the first memory; a first transmitting step, responsive to a request for the output print number from the second server, of transmitting the output print number for each piece of the first identification information stored in the first memory; and a first changing step of changing a permission state of the print job permission information stored in the first memory to an inhibition state of the permission information, in accordance with an inhibition request received from the second server.

According to an embodiment of the invention, a data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided which comprises: a second storing step of storing in a second memory second identification information for identifying a client requested a copy job by the reader unit and the printer unit, an output copy number designated, and copy job permission information for determining a permission or inhibition of executing the copy job; a second counting step of counting the output copy number each time a copy job requested by each client identified by the second identification information is executed; a second inhibiting step of inhibiting a copy job requested by each client in accordance with the copy job permission information stored in the second memory; a second transmitting step, responsive to a request for the output copy number from the second server, of transmitting the output copy number for each piece of the second identification information stored in the second memory; and a second changing step of changing a permission state of the copy job permission information stored in the second memory to an inhibition state of the copy job permission information, in accordance with an inhibition request received from the second server.

According to an embodiment of the invention, a data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided which comprises: a third storing step of storing correspondence information of the first identification information supplied from the first server and the second identification information supplied from the image input/output device; a requesting step of requesting to fetch the output print number from the first server and the output copy number from the image input/output device; a fourth storing step of totalling and storing in a fourth memory for each piece of the identification information, the output print number supplied from the first server and the output copy number supplied from the image input/output device in response to the request by the requesting step; and a notifying step of notifying the first server and the image input/output device of an inhibition request for inhibiting the print job and the copy job, in accordance with a limit output number set for each piece of the identification information and stored in the fourth memory.

According to an embodiment of the invention, a storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided which comprises: a first storing step of storing in a first memory first identification information for identifying a client requested a print job, an output print number designated by the print job, and print job permission information for determining a permission or inhibition of executing the print job; a first counting step of counting the output print number each time a print job requested by each client identified by the first identification information is executed; a first inhibiting step of inhibiting a transmission of a print job requested by each client in accordance with the print job permission information stored in the first memory; a first transmitting step, responsive to a request for the output print number from the second server, of transmitting the output print number for each piece of the first identification information stored in the first memory; and a first changing step of changing a permission state of the print job permission information stored in the first memory to an inhibition state of the permission information, in accordance with an inhibition request received from the second server.

According to an embodiment of the invention, a storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, is provided which comprises: a third storing step of storing correspondence information of the first identification information supplied from the first server and the second identification information supplied from the image input/output device; a requesting step of requesting to fetch the output print number from the first server and the output copy number from the image input/output device; a fourth storing step of totalling and storing in a fourth memory for each piece of the identification information, the output print number supplied from the first server and the output copy number supplied from the image input/output device in response to the request by the requesting step; and a notifying step of notifying the first server and the image input/output device of an inhibition request for inhibiting the print job and the copy job, in accordance with a limit output number set for each piece of the identification information and stored in the fourth memory.

The other objects and features of the present invention will become apparent from the following detailed description of embodiments when read in conjunction with the accompanying drawings.

BRIEF DESCRIPTION OF THE DRAWINGS

FIG. 1 is a block diagram showing the configuration of an image forming system according to an embodiment of the invention.

FIG. 7 is a memory map of a storage medium which is readable by the image processing system and stores various data processing programs.

DETAILED DESCRIPTION OF THE PREFERRED EMBODIMENTS

Figure 2C:
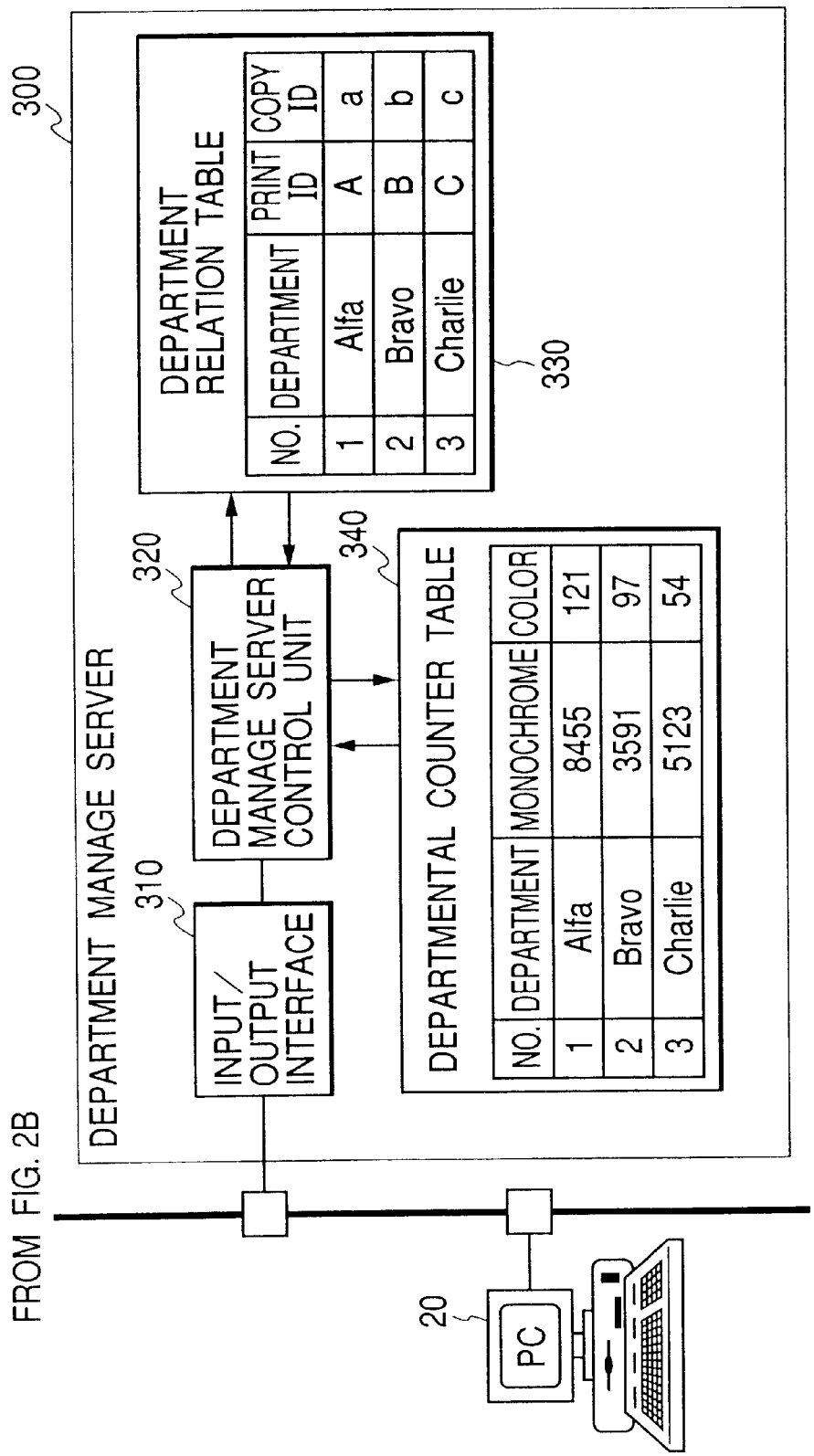
FIG. 2 is composed of FIGS. 2A, 2B and 2C showing a block diagram showing the structure of the image input/output device 200, a print server 100, and a department manage server 300.

Embodiments of the invention will be described with reference to the accompanying drawings.

FIG. 1 is a block diagram showing the configuration of an image forming system according to an embodiment of the invention.

As shown in FIG. 1, the image forming system has a composite function of outputting a print job and a copy job, and is constituted of: an image input/output unit 200 which is used as a common printer for clients 20 on a network 10; a print server 100 for receiving from the network 10 a print job requested by the client 20 and managing the number of outputs of the received print job; and a department manage server 300 connected to the network for managing the number of outputs of the print and copy jobs.

The image input/output device 200 includes a laser beam printer which performs the following copy output number management function. The laser beam printer receives a copy job requested by each user assigned a specific copy job management identification number (hereinafter called a copy ID), outputs the received copy job, and manages the number of copy outputs of the copy job in correspondence with the copy ID of the user. The laser beam printer also outputs a print job requested by the print server 100.

The printer server 100 has the following output print output number management function. The print server 100 receives from the client 20 via the network 10 a print job requested by each user assigned a specific print job management identification number (hereinafter called a print ID), instructs the image input/output device 200 to output the received print job, and manages the number of print outputs of the print job in correspondence with the print ID of the user.

The department manage server 300 receives from the network 10 the output number managed in correspondence with the copy ID by the copy job output number management function of the image input/output device 200 and the output number managed in correspondence with the print ID by the print job output number management function of the print server 100, and calculates a total sum of the print job output number and copy job output number for each department. The term "department" means a predetermined group such as a section and a division. It is assumed that the same copy ID and print ID are assigned to users belonging to the same department.

Next, the structure of the image input/output device 200, print server 100, and department manage server 300 will be described with reference to FIGS. 2A to 2C. FIGS. 2A to 2C are block diagrams showing the structure of the image input/output device 200, print server 100, and department manage server 300 shown in FIG. 1.

As shown in FIGS. 2A to 2C, the image input/output device 200 has an input/output interface 210 connected to the network 10 for data transfer to and from each terminal connected to the network 10. For example, in the data transfer to and from the print server 100, the image input/output device 200 receives data of a print job requested by the print server 100 and an inquiry command for an output state of the print job, and transmits a response to the output state inquiry command. For example, in the data transfer to and from the department manage server 300, the image input/output device 200 receives an inquiry command from the department manage server 300 and transmits a response to the inquiry command.

The data received at the input/output interface 210 is supplied to a print data analysis unit 220 which analyzes the supplied data. If it is judged from this analysis that the supplied data is image data of a print job requested by the client 20, the image data is converted by a printer control unit 250 into printable image data which is output to an image control unit 230. If it is judged that the supplied data is data (e.g., inquiry command) different from print data, the received data is output to the image control unit 230 without data conversion. When data is input from the image control unit 230, the print data analysis unit 220 transmits this data via the input/output interface 210 to a corresponding terminal (such as a print server) on the network 10.

The image control unit 230 controls the printer control unit 250 and an image scanning unit 240, and executes the above-described copy job output number management function. The printer control unit 250 prints out image data input from the image control unit 230. The print output can be either a color output or a monochrome output. The image scanning unit 240 scans images of originals set by a user for each copy job with a CCD or the like and generates image data of the read images. The generated image data is output to the image control unit 230.

When printable image data is supplied from the print data analysis unit 220, the image control unit 230 transfers this image data to the printer control unit 250 and controls the print control unit 250 to print output the image data. When image data is supplied from the image scanning unit 240, the image control unit 230 transfers the image data to the print control unit 250 and controls the print control unit 250 to print out the image data. A series of operations from reading an image of an original at the image scanning unit 240 to printing out the image data at the printer control, is a copy operation. This copy operation can be executed independently from the network 10. An execution instruction of the copy operation is performed by an input operation entered from an operation unit 260. The operation unit 260 has various setting keys such as a copy key for entering an execution instruction of the copy operation and a key for entering the copy ID. In response to each of the various setting keys, a key signal is output to the image control unit 230. The operation unit 260 also has a liquid crystal panel (not shown) for displaying the contents set by setting keys, the operation state notified from the image control unit 230, and the like.

For the copy job output number management function of the image control unit 230, a departmental copy counter table 270 is used which manages the output number of a copy job in correspondence with each copy ID. In the departmental copy counter table 270, each copy ID is registered in a copy ID field. Fields for registering a color output number and a monochrome output number are provided for each copy ID. With the copy job output number management function, when a copy ID of a user requesting a copy job is entered from the operation unit 260, it is checked whether or not the entered copy ID is already registered in the departmental copy counter table 270. If already registered, the output number counted for this copy job is added to the output number registered in the departmental copy counter table 270 corresponding to the entered copy ID to update the contents of the departmental copy counter table 270 so as to have the addition result. Namely, if the entered copy ID is already registered in the departmental copy counter table 270, the output number of the present copy job is cumulatively written in the field corresponding to the copy ID. If the print output is a color output, the output number is cumulatively written in the color output field, whereas if the print output is a monochrome output, the output number is cumulatively written in the monochrome output field. In the example shown in FIGS. 2A to 2C, for the copy ID "a" of the departmental copy counter table 270, "3123" is written in the monochrome output number field and "89" is written in the color output number field. If the entered ID is not already registered in the departmental copy counter table 270, the copy job is inhibited.

In response to a request instruction issued from the department manage server 300, the output numbers and corresponding copy ID's written in the departmental copy counter table 270 are transferred via the network 10 to the department manage server 300 which calculates a total sum of the output numbers of each print job and corresponding copy job. The output numbers written in the departmental copy counter table 270 are periodically reset.

As shown in FIGS. 2A to 2C, the print server 100 has a network interface 110 connected to the network 10 for data transfer to and from each terminal connected to the network 10. For example, in the data transfer to and from the image input/output device 200, the print server 100 transmits data of a print job requested by the client 20 and an inquiry command for an output state of the print job, and receives a response to the output state inquiry command. For example, in the data transfer to and from the department manage server 300, the print server 100 receives an inquiry command from the department manage server 300 and transmits a response to the inquiry command. For example, in the data transfer to and from the client 20, the print server 100 receives data of a print job and an inquiry command for an output state of the print job, and transmits a response to the inquiry command.

The data received at the network interface 110 is supplied to a print server control unit 120. If the supplied data is image data of a print job output from the client 20, the image data of the print job is stored as a print job 131 in a print job memory unit 130. The stored print jobs 131 are transferred to the image input/output device 200 sequentially in the order of output originating sites and outputs.

The print output number of each stored print job 131 is managed by the print job output number management function which is executed by the print server control unit 120. For the print job output number management function of the print server 100, a departmental print counter table 140 is used which manages the copy output number of each copy job 131 in correspondence with each print ID. In the departmental copy counter table 140, each print ID is registered in a print ID field. Fields for registering a color output number and a monochrome output number are provided for each print ID. With the print job output number management function, a print ID is derived from the print job 131 and it is checked whether or not the derived print ID is already registered in the departmental print counter table 140. If already registered, the output number counted for this print job is added to the output number registered in the departmental print counter table 140 corresponding to the print ID to update the contents of the departmental print counter table 140 so as to have the addition result. Namely, if the derived print ID is already registered in the departmental print counter table 140, the output number of the present print job is cumulatively written in the field corresponding to the print ID. If the print output is a color output, the output number is cumulatively written in the color output field, whereas if the print output is a monochrome output, the output number is cumulatively written in the monochrome output field. In the example shown in FIGS. 2A to 2C, for the print ID "A" of the departmental print counter table 140, "5332" is written in the monochrome output number field and "32" is written in the color output number field. If the derived ID is not already registered in the departmental print counter table 140, the print job is inhibited.

In response to a request instruction issued from the department manage server 300, the output numbers and corresponding print ID's written in the departmental print counter table 140 are transferred via the network 10 to the department manage server 300 which calculates a total sum of the output numbers of each print job and corresponding copy job. The output numbers written in the departmental print counter table 140 are periodically reset.

As shown in FIGS. 2A to 2C, the department manage server 300 has an input/output interface 310 connected to the network 10 for data transfer to and from each terminal connected to the network 10. For example, in the data transfer to and from the print server 100, the department manage server 300 transmits an output request instruction command for the output numbers of print jobs to the print server 100, and receives a response to this command. For example, in the data transfer to and from the image input/output device 200, the department manage server 300 transmits an output request instruction command for the output numbers of copy jobs to the image input/output device 200, and receives a response to this command.

The data received at the input/output interface 310 is supplied to a department manage server control unit 320. As described earlier, the department manage server control unit 320 transmits via the input/output interface 310 an output request instruction command for the output numbers of print jobs to the print server 100 and an output request instruction command for the output numbers of copy jobs to the image input/output device 200. When the output numbers of the copy or print jobs are supplied in response to the transmitted command, the department manage server control unit 320 discriminates the users belonging to the same group assigned a specific copy ID and a specific corresponding print ID, by referring to a department relation table 330 which stores user data in a correspondence form of a copy ID and a print ID. In accordance with this discrimination result, the supplied output numbers of the copy or print jobs are totaled and written in a departmental counter table 340. The output request instruction command for the output numbers is periodically transmitted to the print server 100 and image input/output device 340.

The department relation table 330 stores print ID's and copy ID's assigned to respective departments. In the example shown in FIGS. 2A to 2C, a department "Alfa" is assigned "A" as the print ID and "a" as the copy ID, and in the department relation table 330 the print ID "A" and copy ID "a" are written in a correspondence format for the department "Alfa". For this department "Alfa", the output numbers of the print ID "A" and the output numbers of the copy ID "a" are totaled separately for the monochrome (black and white) output and the color output. The total output number for the monochrome output and the total number for the color output are written in the departmental counter table 340 in correspondence with the department "Alfa". Similarly, for other departments "Bravo" and "Charlie", the output numbers of each print ID and each copy ID assigned to each department are totaled separately for the monochrome (black and white) output and the color output. The total output number for the monochrome output and the total number for the color output are written in the departmental counter table 340 in correspondence with each department. The values written in the departmental counter table 340 are reset when they are read to calculate a use charge or the like. The process sequence for totalling for each department the output numbers of copy jobs managed by the image input/output device 200 and the output numbers of print jobs managed by the print server 100, is executed by programs stored in a memory (not shown).

Figure 3:
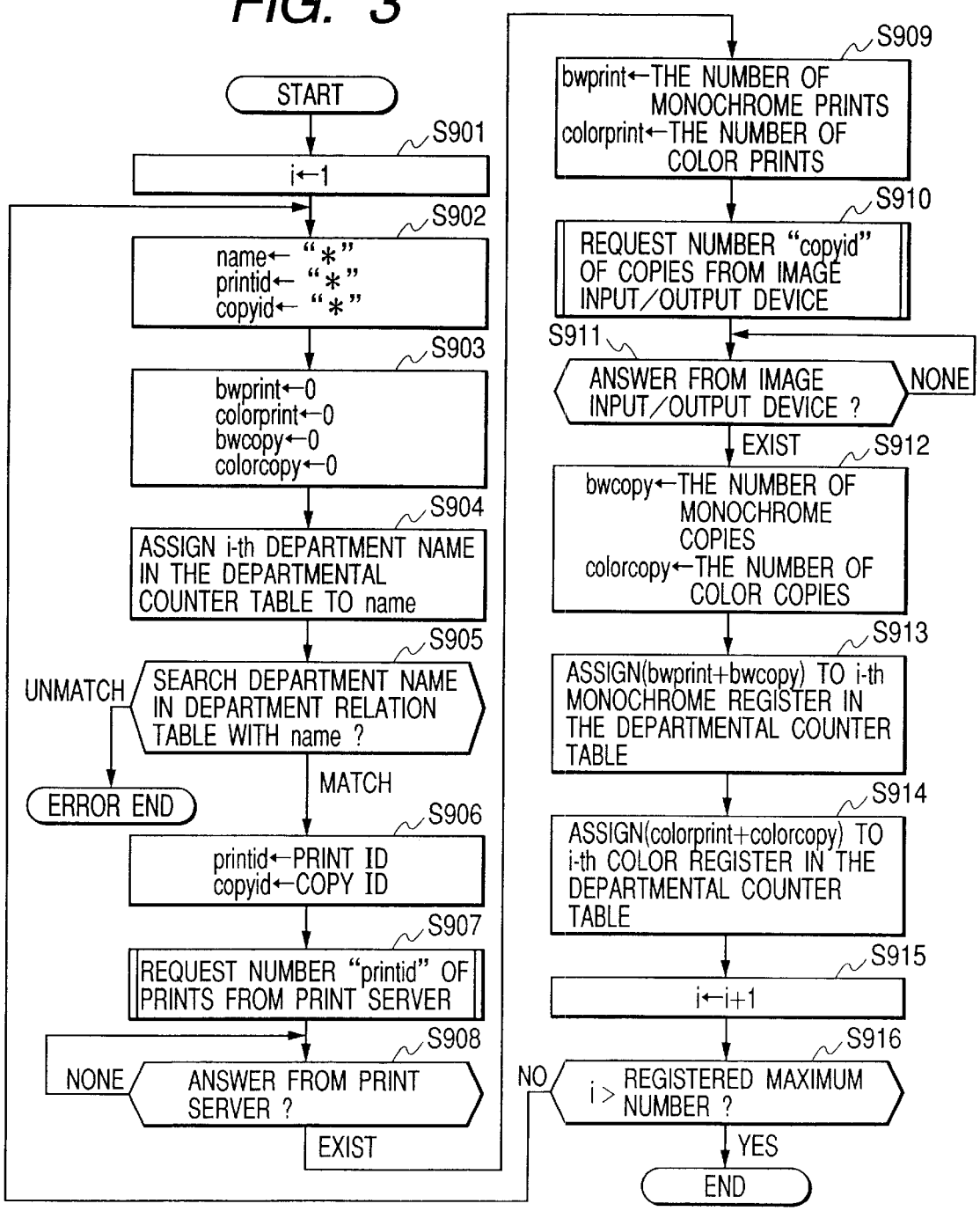
FIG. 3 is a flow chart illustrating a totalling process of the number of outputs of a copy job and a print job to be executed by the department manage server 300 shown in FIG. 1.

Next, a process of totalling the output numbers of copy and print jobs to be executed by the department manage server 300 will be described with reference to FIG. 3. FIG. 3 is a flow chart illustrating the process of totalling the output numbers of copy and print jobs to be executed by the department manage server 300 shown in FIG. 1.

Referring to FIG. 3, when the output numbers of copy and print jobs are totalled, first at Step S901 a variable i corresponding to a department number is initialized to "1". This variable i indicates the number used in the department relation table 330 and departmental counter table 340.

Next, at Step S902, a variable "name" to be used for searching a department name, a variable "printid" for the print ID, and a variable "copyid" for the copy ID, are initialized. At the next Step S903, a variable "bwprint" for the output number of monochrome print outputs, a variable "colorprint" for the output number of color print outputs, a variable "bwcopy" for the output number of monochrome copy outputs, a variable "colorcopy" for the output number of color copy outputs, are initialized to "0".

At the next Step S904 the departmental counter table 340 is referred to to assign the i-th department name to the variable "name". At the next Step S905 the department relation table 330 is searched by using the variable "name" as a search key, to check whether the department name coincident with that assigned to the variable "name" is already written in the department relation table 330. If not, it is judged as a registration error to terminate the process, whereas if written, the flow advances to Step S906.

At Step S906 the print ID corresponding to the department name coincident with that assigned to the variable "name" is assigned to the variable "printid", and the copy ID corresponding to the department name coincident with that assigned to the variable "name" is assigned to the variable "copyid". At the next Step S907 a command is transmitted via the input/output interface 310 and network 10 to the print server 100, the command requesting the print output number corresponding to the variable "printid" assigned the corresponding print ID. At the next Step S908 a response from the print server 100 is waited for. Upon reception of the command, the print server 100 reads the monochrome and color output numbers of outputs of the print ID corresponding to the variable "printid", from the departmental print counter table 140, and returns the read output numbers to the department manage server 300. Upon reception of the monochrome and color output numbers of outputs of the print ID corresponding to the variable "printid" returned from the print server 100, at Step S909 the monochrome output number of outputs of the print ID corresponding to the variable "printid" is assigned to the variable "bwprint", and the corresponding color output number is assigned to the variable "colorprint".

At the next Step S910 a command is transmitted via the input/output interface 310 and network 10 to the image input/output device 200, the command requesting the copy output number corresponding to the variable "copyid" assigned the corresponding copy ID. At the next Step S911 a response from the image input/output device 200 is waited for. Upon reception of the command, the image input/output device 200 reads the monochrome and color output numbers of outputs of the copy ID corresponding to the variable "copyid", from the departmental copy counter table 270, and returns the read output numbers to the department manage server 300. Upon reception of the monochrome and color output numbers of outputs of the copy ID corresponding to the variable "copyid" returned from the image input/output device 200, at Step S912 the monochrome output number of outputs of the copy ID corresponding to the variable "copyid" is assigned to the variable "bwcopy", and the corresponding color output number is assigned to the variable "colorcopy".

At the next Step S913 a total sum of the variables "bwprint" and "bwcopy" is calculated and loaded in an i-th monochrome register of the departmental counter table 340. Namely, the total sum is written in an i-th monochrome output number field of the departmental counter table 340. At the next Step S914 a total sum of the variables "colorprint" and "colorcopy" is calculated and loaded in an i-th color register of the departmental counter table 340. Namely, the total sum is written in an i-th color output number field of the departmental counter table 340.

At Step S915 the variable i is incremented by "1". At the next Step S916 the variable i is compared with a currently registered maximum department number. If the variable i is not larger than the currently registered maximum department number, the flow returns to Step S902 to repeat the following Steps, whereas if larger, it is judged that the total sums of the copy and print output numbers of all departments were calculated, and the process is terminated.

As above, it is possible to collectively manage for each department the output numbers of copy jobs managed by the image input/output device 200 and the output numbers of print jobs managed by the print server 100. It is therefore easy to calculate for each department the total sums of the output numbers of copy and print jobs requested by users belonging to the department. A user charge incurred to each department or the like can be calculated very easily.

As described so far, in the image forming system of the embodiment, the composite function image forming apparatus has a copy job output number management function of receiving a copy job requested by each client user assigned a specific copy job management identification number, outputting the received copy job, and managing the number of copy outputs of the copy job in correspondence with the copy job management identification number; the print server has a print job output number management function of receiving from the network a print job requested by each client user assigned a specific print job management identification number, instructing the composite function image forming apparatus to print out the received print job, and managing the number of print outputs of the print job in correspondence with the print job management identification number; and a totalling apparatus is provided on the network, the totalling apparatus comprising: storage means for storing user data in a correspondence format of the copy job management identification number and the print job management identification number; and user discriminating means for discriminating between client users each having a specific copy job management identification number and a specific print job management identification number by referring to the user data stored in the storage means, wherein the totalling apparatus fetches via the network the output number managed by the copy job output number management function of the composite function image forming apparatus in correspondence with the copy job management identification number and the output number managed by the print job output number management function of the print server in correspondence with the print job management identification number, and totals the output number of copy jobs and the output number of print jobs for each client user in accordance with a discrimination result by the user discriminating means. Accordingly, the output numbers of copy and print jobs of each user can be collectively managed.

The totalling apparatus transmits a request instruction to the composite function image forming apparatus via the network, the request instruction fetching the output number managed by the copy job output number management function of the composite function image forming apparatus in correspondence with the copy job management identification number, and transmits a request instruction to the print server via the network, the request instruction fetching the output number managed by the print job output number management function of the print server in correspondence with the print job management identification number; the composite image forming apparatus responsive to the request instruction from the totalling apparatus transmits over the network the output number managed by the copy job output number management function; and the print server responsive to the request instruction from the totalling apparatus transmits over the network the output number managed by the print job output number management function. Accordingly, the output numbers of copy and print jobs of each user can be collectively managed.

The composite function image forming apparatus may comprise copy job output number storage means for storing the output number of copy jobs in correspondence with each copy job management identification number, copy job management identification number storage means for storing the copy job management identification number, input means for inputting the copy job management identification number of a client user requested a copy job, comparison means for comparing the copy job management identification number entered by the input means with the copy job management identification number stored in the copy job management identification number storage means, and count means for counting the output number when the copy job requested by the client user is output; wherein if a comparison result by the comparison means indicates that the input copy job management identification number is coincident with the stored copy job management identification number, the composite function image forming apparatus adds the output number counted by the count means to the output number stored in the copy job output number storage means in correspondence with the coincident copy job management identification number to update the output number stored in the copy job output number storage means so as to have an addition result, and in response to the request instruction from the totalling apparatus, the composite function image forming apparatus transmits via the network to the totalling apparatus the output number stored in the copy job output number storage means and the corresponding copy job management identification number.

If a comparison result by the comparison means indicates that the input copy job management identification number is not coincident with the stored copy job management identification number, the composite function image forming apparatus may inhibit an output of the requested copy job.

The print server may comprise print job output number storage means for storing the output number of print jobs in correspondence with each print job management identification number, print job management identification number storage means for storing the print job management identification number, input means for inputting the print job management identification number of a client user requested a print job, comparison means for comparing the print job management identification number entered by the input means with the print job management identification number stored in the print job management identification number storage means, and count means for counting the output number of the print job requested by the client user; wherein if a comparison result by the comparison means indicates that the input print job management identification number is coincident with the stored print job management identification number, the print server adds the output number counted by the count means to the output number stored in the print job output number storage means in correspondence with the coincident print job management identification number to update the output number stored in the print job output number storage means so as to have an addition result, and in response to the request instruction from the totalling apparatus, the print server transmits via the network to the totalling apparatus the output number stored in the print job output number storage means and the corresponding print job management identification number.

If a comparison result by the comparison means indicates that the input print job management identification number is not coincident with the stored print job management identification number, the print server may inhibit an output of the requested print job.

In an output number management method of managing an output number of a print job and an output number of a copy job for an image forming system having a print server for using a composite function image forming apparatus having a composite function of outputting a print job and a copy job, as a common output apparatus for print jobs requested by client users on a network and received from the network, a totalling apparatus is provided on the network, the composite function image forming apparatus receives a copy job requested by each client user assigned a specific copy job management identification number, outputs the received copy job, and manages the number of copy outputs of the copy job in correspondence with the copy job management identification number; the print server receives from the network a print job requested by each client user assigned a specific print job management identification number, instructs the composite function image forming apparatus to print out the received print job, and manages the number of print outputs of the print job in correspondence with the print job management identification number; and the totalling apparatus stores in storage means user data in a correspondence format of the copy job management identification number and the print job management identification number, discriminates between client users each having a specific copy job management identification number and a specific print job management identification number by referring to the user data stored in the storage means, wherein the totalling apparatus fetches via the network the output number managed by the composite function image forming apparatus in correspondence with the copy job management identification number and the output number managed by the print server in correspondence with the print job management identification number, and totals the output number of copy jobs and the output number of print jobs for each client user in accordance with a discrimination result. Accordingly, the output numbers of copy and print jobs of each user can be collectively managed.

The totalling apparatus transmits a request instruction to the composite function image forming apparatus via the network, the request instruction fetching the output number managed by the composite function image forming apparatus in correspondence with the copy job management identification number, and transmits a request instruction to the print server via the network, the request instruction fetching the output number managed by the print server in correspondence with the print job management identification number; the composite image forming apparatus responsive to the request instruction from the totalling apparatus transmits over the network the managed output number; and the print server responsive to the request instruction from the totalling apparatus transmits over the network the managed output number. Accordingly, the output numbers of copy and print jobs of each user can be collectively managed.

In a storage medium storing a program for configuring on an image forming system an output number management system for managing an output number of a print job and an output number of a copy job, the image forming system including a composite function image forming apparatus with a composite function of outputting the print job and the copy job and a print server, the composite function image forming apparatus having a copy job output number management function of receiving a copy job requested by each client user assigned a specific copy job management identification number, outputting the received copy job, and managing the number of copy outputs of the copy job in correspondence with the copy job management identification number, the print server having a print job output number management function of receiving from the network a print job requested by each client user assigned a specific print job management identification number, instructing the composite function image forming apparatus to print out the received print job, and managing the number of print outputs of the print job in correspondence with the print job management identification number, the program is executable by an information processing apparatus provided on the network and comprises: a storage module for storing user data in a correspondence format of the copy job management identification number and the print job management identification number; a user discriminating module for discriminating between client users each having a specific copy job management identification number and a specific print job management identification number by referring to the user data stored in the storage module; a fetch control module for controlling to fetch via the network the output number managed by the copy job output number management function of the composite function image forming apparatus in correspondence with the copy job management identification number and the output number managed by the print job output number management function of the print server in correspondence with the print job management identification number; and a totalling module for totalling the output number of copy jobs and the output number of print jobs for each client user in accordance with a discrimination result by the user discriminating module. Accordingly, the output numbers of copy and print jobs of each user can be collectively managed.

The fetch control module performs a request instruction process of transmitting a request instruction to the composite function image forming apparatus via the network, the request instruction fetching the output number managed by the copy job output number management function of the composite function image forming apparatus in correspondence with the copy job management identification number, and transmitting a request instruction to the print server via the network, the request instruction fetching the output number managed by the print job output number management function of the print server in correspondence with the print job management identification number. Accordingly, the output numbers of copy and print jobs of each user can be collectively managed.

FIG. 1 is a schematic block diagram showing the whole structure of an image processing (forming) system applicable to the invention. The image processing system has a print server 100, an image input/output device 200, a department manage server 300, and a personal computer 20, respectively interconnected via a network 10 serving as a predetermined communication medium.

Figure 4B:
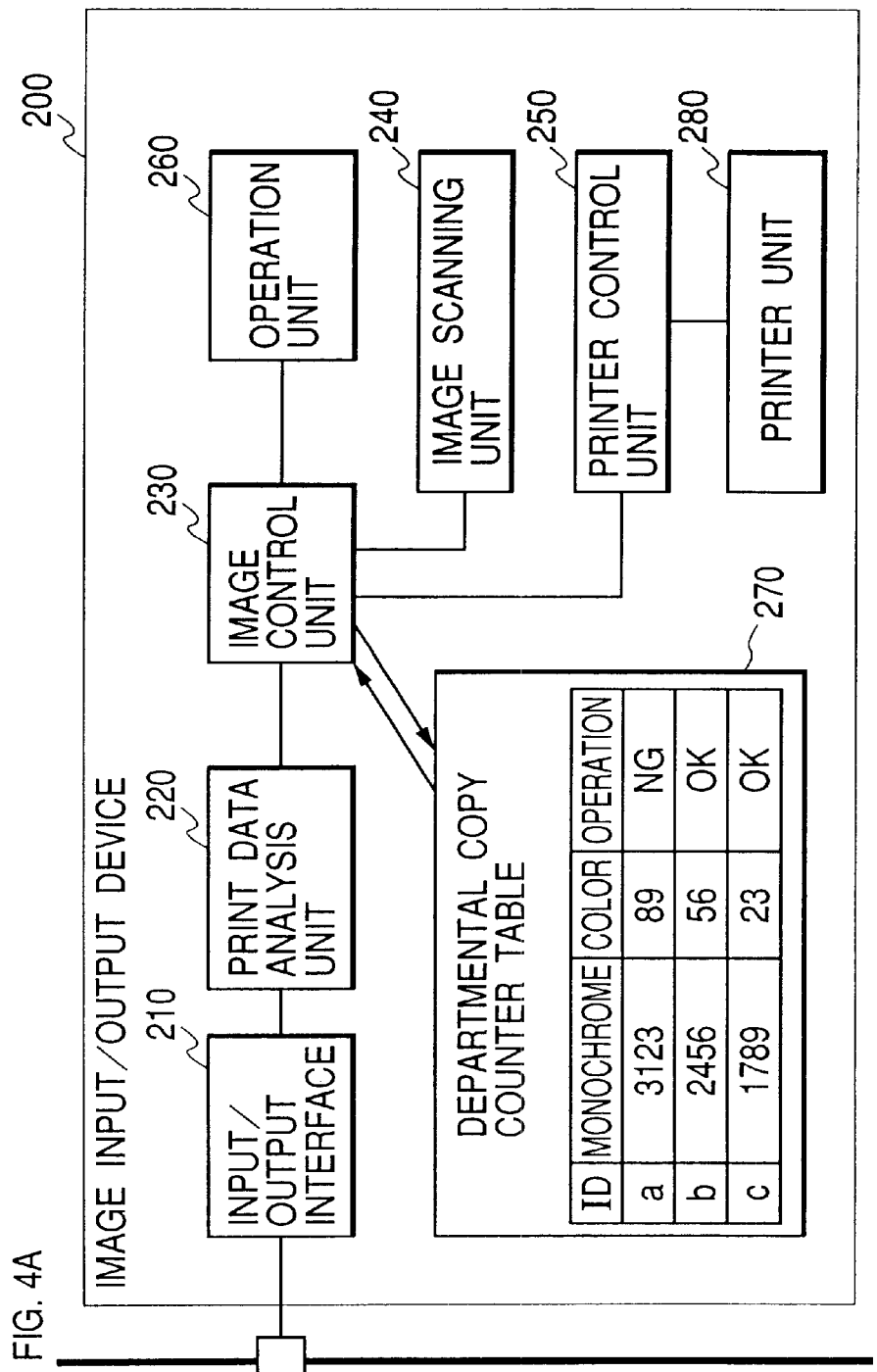
FIG. 4 is composed of FIGS. 4A, 4B and 4C showing a block diagram showing the structure of a control system of the image processing system according to an embodiment of the invention.

FIGS. 4A to 4C are block diagrams showing the structure of a control system of the image processing system according to an embodiment of the invention. Like elements to those shown in FIG. 1 are represented by using identical reference numerals.

[Print Server 100]

The print server 100 is constituted of a network interface 110, a print server control unit 120, a print job memory unit 130, and a departmental print counter table 140. The structure and operation thereof will be described below.

The network interface 110 connected to the network 10 has the following function. The network interface 110 receives data from the network 10, transfers it to the print server control unit 120, and transfers data supplied from the print server control unit 120 to another terminal connected to the network 10.

The print server control unit 120 receives via the network interface 110 a print job 131 output from the personal computer 20 and stores it in the print job memory unit 130. The print server control unit 120 supplies the print jobs 131 to the image input/output device 200 sequentially in accordance with print output destination data and output priority data contained in the print jobs 131.

The departmental print counter table 140 is a database capable of being read and written by the print server control unit 120. The departmental print counter table 140 registers, for each currently registered department, an ID, a monochrome print output number, a color print output number, and an operation permission flag.

In the example of the departmental print counter table 140 shown in FIGS. 4A to 4C, the department with its ID "A" has the monochrome print output number of "5332", the color print output number of "32", and the operation permission flag of "NG".

If the ID is already registered in the departmental print counter table 140, the print server control unit 120 analyzes data of the supplied print job 131 to check an ID registration field in the data.

For example, if the print server control unit 120 analyzes that the data of the print job 131 contains the ID "A", the print server control unit 120 searches the ID field of the departmental print counter table 140 and if the ID "A" is detected, it judges that the ID "A" is already registered.

Next, the print server control unit 120 checks the operation permission flag. In this example, since the operation of the department "A" is NG, the print operation is not performed. Similarly, if the print server control unit 120 analyzes that the data of the print job 131 contains the ID "B", the print server control unit 120 searches the ID field of the departmental print counter table 140 and if the ID "B" is detected, it judges that the ID is already registered.

Next, the print server control unit 120 checks the operation permission flag. In this example, since the operation of the department "B" is OK, the print operation is performed. Thereafter, if the print job 131 is performed for monochrome outputs, the print server control unit 120 increments the count of the monochrome print outputs of the department "B" in the departmental print counter table 140.

[Image Input/Output Device 200]

The image input/output device 200 is constituted of an input/output interface 210, a print data analysis unit 220, an image control unit 230, an image scanning unit 240, a printer control unit 250, an operation unit 260, and a departmental copy counter table 270.

The input/output interface 210 connected to the network 10 has the following function. The input/output interface 210 receives image data from the print server 100 and an inquiry (command) issued from the department manage server 300 via the network 10, informs an image output state to the print server 100, and transmits a response to the inquiry (command) from the department manage server 300 via the network 10.

The print data analysis unit 220 analyzes image data supplied from the personal computer 20, and the printer control unit 250 converts the image data into a printable data format. After the image data is converted into the printable data format by the printer control unit 250, the image data is sent back to the image control unit 230.

If the analysis result by the print data analysis unit 220 indicates that the data supplied from the input/output interface 210 is not the image data but other data such as the inquiry (command) issued from the department manage server 300, the data is directly transferred to the image control unit 230 without data conversion.

Conversely, when the print data analysis unit 220 receives data from the image control unit 230, the data is transmitted via the input/output interface 210 to the network 10 without data conversion.

The image scanning unit 240 connected to the image control unit 230 optically scans an original, reads the image of the original with reading means such as a CCD, and converts it into image data.

The printer control unit 250 connected to the image control unit 230 controls a printer unit 280 to print out the image data supplied from the image control unit 230. In this embodiment, the printer unit 280 can provide two types of outputs, color print outputs and monochrome print outputs which are switched upon an instruction from the image control unit 230.

The image control unit 230 receives image data either from the print data analysis unit 220 or the image scanning unit 240, and supplies the image data to the printer control unit 250 which controls the printer unit 280 to print out the image data.

The operation unit 260 connected to the image control unit 230 monitors the operation state of the image control unit 230. The operation state can be displayed on an unrepresented display area of the operation unit 260. An operation of the image control unit 230 can be instructed from the operation unit 260.

For example, a series of operations from reading an image of an original at the image scanning unit 240 to transferring the image data to print it out at the printer unit 280 can be instructed to the image control unit 230 from the operation unit 260. This operation can be executed only at the image input/output device 200 independently from the network 10. Namely, a copy operation can be executed solely at the image input/output device 200.

The departmental copy counter table 270 is a database capable of being written and read by the image control unit 230. The departmental copy counter table 270 registers, for each currently registered department, an ID, a monochrome copy output number, a color copy output number, and a copy operation permission flag. Reference numeral 280 represents the printer unit.

In the example of the departmental copy counter table 170 shown in FIGS. 4A to 4C, the department with its ID "a" has the monochrome copy output number of "3123", the color copy output number of "89", and the copy operation permission flag of "NG". An ID is registered from the operation unit 260.

Unless an ID already registered in the departmental copy counter table 270 is entered from the operation unit 260, the image control unit 230 does not permit a copy operation.

If an ID already registered in the departmental copy counter table 270 is entered from the operation unit 260, the image control unit 230 checks the copy operation permission flag of the ID. If OK, the copy operation is permitted. The printer control unit 250 notifies the number of copy outputs during the copy operation, and the image control unit 230 updates the value in the departmental copy counter table 270.

For example, if the ID "a" is entered from the operation unit 260, the operation unit 260 transfers data "a" to the image control unit 230. The image control unit 230 searches the ID field of the departmental copy counter table 270. If the ID "a" is detected, it is judged that the ID is already registered. Then, the image control unit 230 checks the copy operation permission flag. In this example shown in FIGS. 4A to 4C, the copy operation of the ID "a" is not permitted so that the image control unit 230 notifies a copy operation inhibition to the operation unit 260.

Similarly, if the ID "b" is entered from the operation unit 260, the operation unit 260 transfers data "b" to the image control unit 230. The image control unit 230 searches the ID field of the departmental copy counter table 270. If the ID "b" is detected, it is judged that the ID is already registered. Then, the image control unit 230 checks the copy operation permission flag. In this example shown in FIGS. 4A to 4C, the copy operation of the ID "b" is permitted so that the image control unit 230 notifies a copy operation permission to the operation unit 260 and waits for a copy start instruction from the operation unit 260. After the copy operation, the image control unit 230 increases the count of the monochrome copy field of the ID "b" in the departmental copy counter table 270 by the number of copy outputs notified by the printer control unit 250.

[Department Manage Server 300]

The department manage server 300 is constituted of an input/output interface 310, a department manage server control unit 320, a department relation table 330, and a departmental counter table 340.

The input/output interface 310 connected to the network 10 has the following function. The input/output interface 310 receives data from the network 10, transfers it to the department manage server control unit, and transmits data supplied from the department manage server control unit 320 to another terminal connected to the network 10.

The department manage server control unit 320 connected to the input/output interface 310 controls the database of the department relation table 330 and the database of the departmental counter table 340. The department relation table 330 stores print ID's and copy ID's in a correspondence format.

In the example of the department relation table 330 shown in FIGS. 4A to 4C, the department "Alfa" has the print ID "A" and the copy ID "a".

The departmental counter table 340 stores monochrome output numbers and color output numbers for each department. In the example of the departmental counter table 340 shown in FIGS. 4A to 4C, the department "Bravo" has the monochrome output number of "3591" which is a total sum of the print output number and copy output number, and the color output number of "97".

The characteristic structures of the embodiment will be described with reference to FIGS. 1 and 4A to 4C.

The image processing system comprises: a first server (print server 100) for storing and managing a print job requested by a client and received via a predetermined communication medium; an image input/output device 200 having a printer unit 280 for receiving the print job stored in the first server via the predetermined communication medium and outputting image data or outputting image data supplied from a reader unit (image scanning unit 240); and a second server (department manage server 300) for totalling and managing a print output number of the first server and a copy output number of the image input/output device through communications with the first server and the image input/output device via the predetermined communication medium, and inhibiting a use of the first server and the image input/output device in accordance with a total sum obtained through totalling by the second server. Accordingly, the desired network environment can be configured which can reliably inhibit the use of the print and copy job functions in accordance with the total sum of print and copy outputs of each user, when the image input/output device having the printer unit and scanner unit capable of outputting both a print job and a copy job is connected to the network.

In the image processing system having a first server (print server 100) for storing and managing a print job requested by a client and received via a predetermined communication medium, an image input/output device (200) having a printer unit for receiving the print job stored in the first server via the predetermined communication medium and outputting image data or outputting image data supplied from a reader unit, and a second server (department manage server 300) capable of communicating with the first server and the image input/output device via the predetermined communication medium, the first server comprises: first storage means for storing first identification information for identifying a client requested a print job, an output print number designated by the print job, and print job permission information for determining a permission or inhibition of executing the print job (being stored as an operation flag of the departmental print counter table 140 in an unrepresented memory of the print server 100); first count means (print server control unit 120) for counting the output print number each time a print job requested by each client identified by the first identification information is executed; first inhibition means for inhibiting a transmission of a print job requested by each client in accordance with the print job permission information stored in the first storage means (inhibiting if the operation flag of the print server control unit 120 is set to NG); first transmission means, responsive to a request for the output print number from the second server, for transmitting the output print number for each piece of the first identification information stored in the first storage means (the print server control unit 120 transmits via the network interface 110); and print control means (print server control unit 120) for changing a permission state of the print job permission information stored in the first storage means to an inhibition state of the permission information, in accordance with an inhibition request received from the second server; the image input/output device (image input/output device 200) comprises: second storage means for storing second identification information for identifying a client requested a copy job by the reader unit (image scanning unit 240) and the printer unit 280, an output copy number designated, and copy job permission information for determining a permission or inhibition of executing the copy job (being stored as an operation flag of the departmental copy counter table 270 in a memory of the image input/output device 200); second count means (image control unit 230) for counting the output copy number each time a copy job requested by each client identified by the second identification information is executed; second inhibition means for inhibiting a copy job requested by each client in accordance with the copy job permission information stored in the second storage means (the image control unit 230 inhibits if the operation flag is set to NG); second transmission means, responsive to a request for the output copy number from the second server, for transmitting the output copy number for each piece of the second identification information stored in the second storage means (the image control unit 230 transmits via the input/output interface); and copy control means (image control unit 230) for changing a permission state of the copy job permission information stored in the second storage means to an inhibition state of the copy job permission information, in accordance with an inhibition request received from the second server; and the second server (department manage server 320) comprises: third storage means (department relation table 330 in a memory of the department manage server 300) for storing correspondence information of the first identification information supplied from the first server and the second identification information supplied from the image input/output device; request means for requesting to fetch the output print number from the first server and the output copy number from the image input/output device (the department manage server control unit 230 requests via the input/output interface 310); fourth storage means (departmental counter table 340 in a memory of the department manage server 300) for totalling and storing for each piece of the identification information, the output print number supplied from the first server and the output copy number supplied from the image input/output device in response to the request by the request means; and notifying means for notifying the first server and the image input/output device of an inhibition request for inhibiting the print job and the copy job, in accordance with a limit output number set for each piece of the identification information and stored in the fourth storage means (the department manage server control unit 320 notifies via the input/output interface 310). Accordingly, the desired network environment can be configured which can reliably manage the state that the total sum of the print and copy outputs exceeds the predetermined limit output value and can reliably inhibit the use of the print and copy job functions in accordance with the total sum of print and copy outputs of each user, when the image input/output device having the printer unit and scanner unit capable of outputting both a print job and a copy job is connected to the network.

The printer server control unit 120 transmits the received print job to the image input/output device 200 via the network interface 110 if the client requested the print job is coincident with the stored identification information. Accordingly, a user different from a specific user allowed to use the print function can be reliably prevented from using the print function.

A copy operation by the reader unit and the printer unit is permitted to be executed, if the client requested the copy job is coincident with the stored identification information. Accordingly, a user different from a specific user allowed to use the copy function can be reliably prevented from using the copy function.

With reference to the flow charts of FIGS. 5 and 6, the print process, copy process, and the like of the image processing system of this embodiment will be described.

Figure 5:
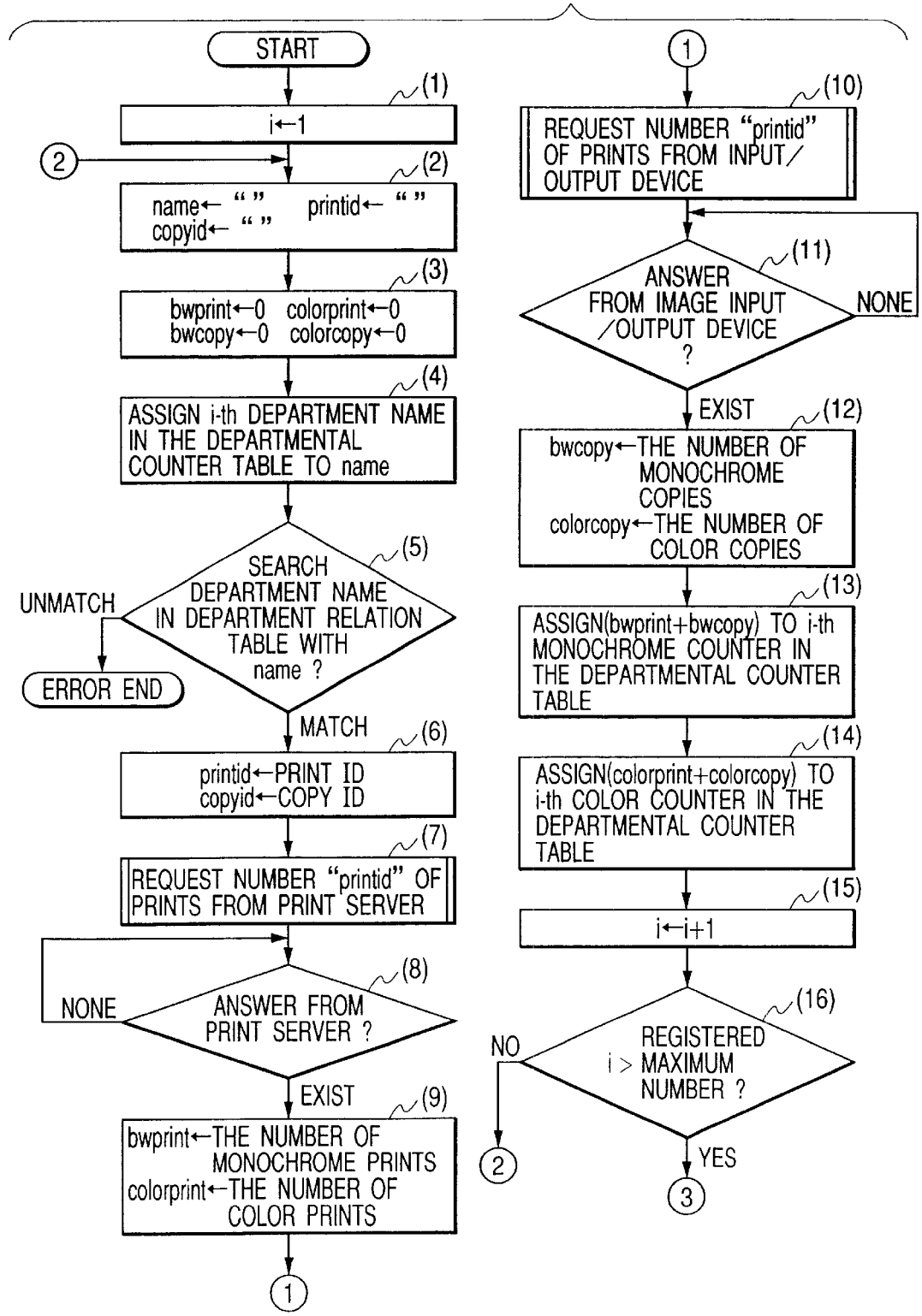
FIG. 5 is a flow chart illustrating an example of an image process sequence to be executed by the image processing system of the embodiment.
Figure 6:
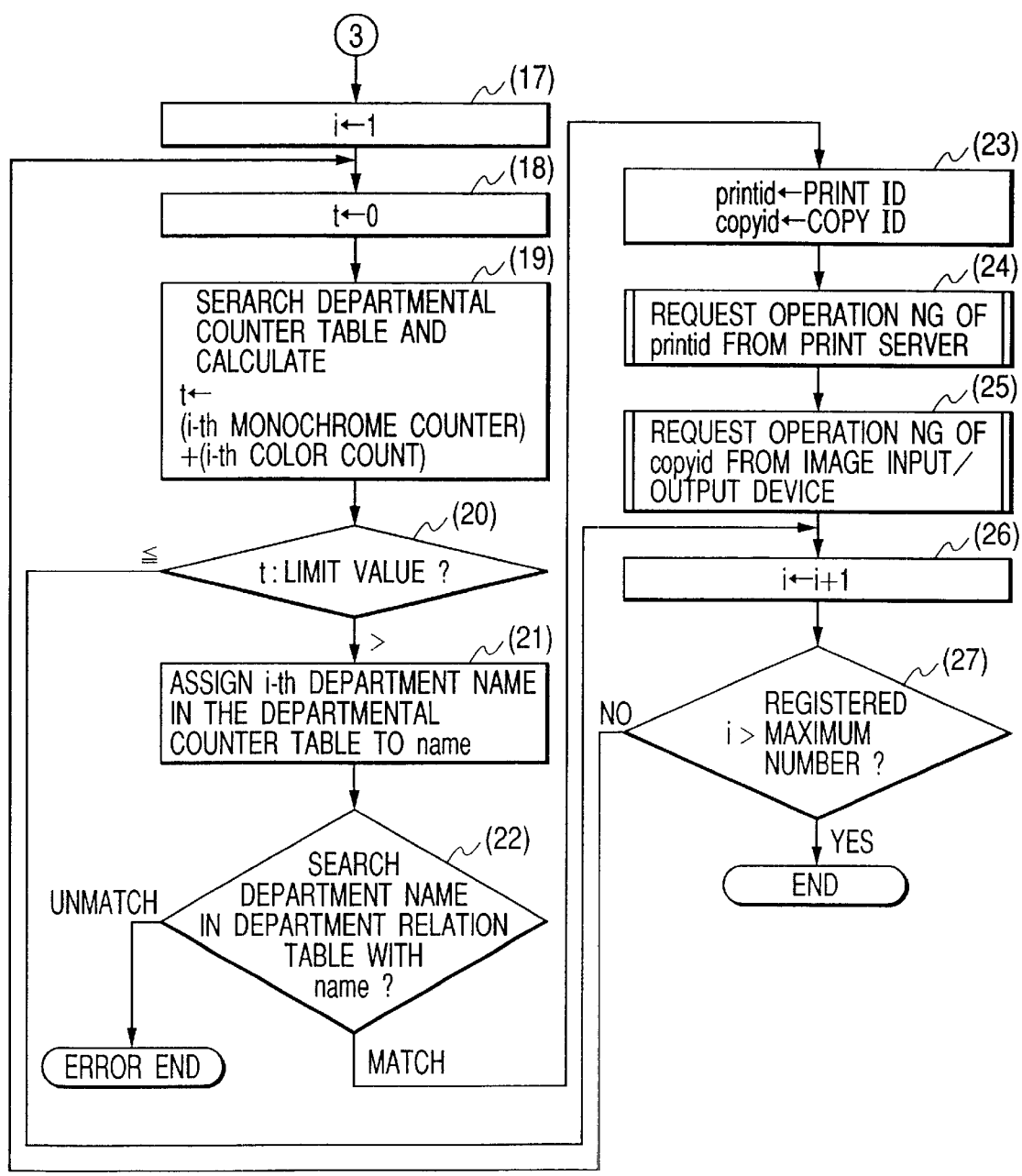
FIG. 6 is a flow chart illustrating an example of the image process sequence to be executed by the image processing system of the embodiment.

FIGS. 5 and 6 are flow charts illustrating an example of an image process sequence to be executed by the image processing system of the embodiment. The image process sequence corresponds to a print operation limitation and a copy operation limitation for each department to be controlled by the department manage server control unit 320 shown in FIGS. 4A to 4C. This sequence includes Steps (1) to (27).

First at Step (1), a variable i corresponding to a department number is initialized to "1". Next at Step (2), a variable "name" to be used for searching a department name, a variable "printid" for the print ID, and a variable "copyid" for the copy ID, are initialized.

At Step (3), a variable "bwprint" for the output number of monochrome print outputs, a variable "colorprint" for the output number of color print outputs, a variable "bwcopy" for the output number of monochrome copy outputs, a variable "colorcopy" for the output number of color copy outputs, are initialized to "0".

Next at Step (4), the departmental counter table 340 is referred to assign the i-th department name to the variable "name". At Step (5), the department relation table 330 is searched by using the variable "name" as a search key, to check whether the department name coincident with that assigned to the variable "name" is written in the department relation table 330. If not, it is judged as a registration error to terminate the process.

If there is a coincident department name at Step (5), the flow advances to Step (6) whereat the print ID corresponding to the coincident department name is assigned to the variable "printid", and the corresponding copy ID is assigned to the variable "copyid".

Next at Step (7) a command is transmitted via the input/output interface 310 and network 10 to the print server 100, the command requesting the print output number corresponding to the variable "printid".

At Step (8) a response from the print server 100 is waited for. Upon reception of the response, the flow advances to Step (9) whereat the monochrome output number of outputs of the department corresponding to the variable "name" and supplied from the print server 100 is assigned to the variable "bwprint", and the corresponding color output number is assigned to the variable "colorprint".

Next at Step (10) a command is transmitted via the input/output interface 310 and network 10 to the image input/output device 200, the command requesting the copy output number corresponding to the variable "copyid".

At Step (11) a response from the image input/output device 200 is waited for. Upon reception of the response, the flow advances to Step (12) whereat the monochrome output number of outputs of the department corresponding to the variable "copyid" and supplied from the image input/output device 200 is assigned to the variable "bwcopy", and the corresponding color output number is assigned to the variable "colorcopy".

Next, at Step (13) a total sum of the variables "bwprint" and "bwcopy" is calculated and loaded in an i-th monochrome counter of the departmental counter table 340.

Next, at Step (14) a total sum of the variables "colorprint" and "colorcopy" is calculated and loaded in an i-th color counter of the departmental counter table 340.

Next, at Step (15) the variable i is incremented by "1". At Step (16) the variable i is compared with a currently registered maximum department number. If the variable i is not larger than the currently registered maximum department number, the flow returns to Step (2) to repeat similar operations.

If it is judged at Step (16) that the variable i is larger than the maximum number, it means that the counts of all the registered departments were calculated and entered in the departmental counter table 340.

Next, at Step (17) shown in FIG. 6, the variable i is initialized to "1". At Step (18) a variable t is initialized to "0". At Step (19) the departmental counter table 340 is searched and a total sum of the i-th monochrome count and the i-th color count is assigned to the variable t.

At Step (20) the variable t is compared with a limit value to check whether the variable t is larger than the limit value. If not, the flow advances to Step (26), whereas if larger, the flow advances to Step (21) whereat the i-th department name of the departmental counter table 340 is assigned to the variable "name".

Next, at Step (22), the department name in the department relation table 330 is searched by using the variable "name" as a search key, to check whether there is a coincident department name. If not, it is judged as a registration error to terminate the process.

If there is a coincident department name at Step (22), the flow advances to Step (23) whereat the print ID corresponding to the coincident department name is assigned to the variable "printid", and the corresponding copy ID is assigned to the variable "copyid".

Next at Step (24) a command is transmitted via the input/output interface 310 and network 10 to the print server 100, the command setting an operation inhibition of the variable "printid".

Next at Step (25) a command is transmitted via the input/output interface 310 and network 10 to the print server 100, the command setting an operation inhibition of the variable "copyid".

Next, at Step (26) the variable i is incremented by "1". At Step (27) the variable i is compared with the currently registered maximum department number. If the variable i is not larger than the currently registered maximum department number, the flow returns to Step (18) to repeat similar operations.

If it is judged at Step (27) that the variable i is larger than the maximum number, it means that the print and copy limitations are set to all the departments having the limited output number among all the registered departments, to thereby terminate the process.

Steps (1) to (27) are periodically executed (after a lapse of a predetermined time period, including the time period during which communications over the network is possible). The limit value at Step (2) may be set differently for each department.

In this embodiment, although a single image input/output device 200 is connected to the network, a plurality image input/output devices may be connected.

An image input/output device may be used which is made of a printer and a scanner each having an independent input/output function.

Next, the characteristic structures of the embodiment will be described with reference to the flow charts of FIGS. 5 and 6.

In the data management method for an image processing system having a first server (print server 100) for storing and managing a print job requested by a client and received via a predetermined communication medium, an image input/output device 200 having a printer unit for receiving the print job stored in the first server via the predetermined communication medium and outputting image data or outputting image data supplied from a reader unit, and a second server (department manage server 300) capable of communicating with the first server and the image input/output device via the predetermined communication medium, or in the storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method or program comprises: a first storing step (not shown) of storing in a first memory first identification information for identifying a client requested a print job, an output print number designated by the print job, and print job permission information for determining a permission or inhibition of executing the print job; a first counting step (not shown) of counting the output print number each time a print job requested by each client identified by the first identification information is executed; a first inhibiting step (not shown) of inhibiting a transmission of a print job requested by each client in accordance with the print job permission information stored in the first memory; a first transmitting step (not shown), responsive to a request for the output print number from the second server, of transmitting the output print number for each piece of the first identification information stored in the first memory; and a first changing step (not shown) of changing a permission state of the print job permission information stored in the first memory to an inhibition state of the permission information, in accordance with an inhibition request received from the second server. Accordingly, when the image input/output device having the printer unit and scanner unit capable of outputting both a print job and a copy job is connected to the network, the output print number of each user is managed, and the output print number managed for each user is transmitted in response to a request from the second server. If the total sum of the transmitted output print number and the output copy number obtained by the second server exceeds a predetermined limit output value, in accordance with the inhibition request supplied from the second server, a permission state of print job inhibition information stored in the first memory is changed to an inhibition state, irrespective of whether or not a user has a small print output number and a large copy output number or vice versa. In this manner, a transmission of the print job by a user exceeding the output limit value can be reliably limited.

In the data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, or in the storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method or program comprises: a second storing step (not shown) of storing in a second memory second identification information for identifying a client requested a copy job by the reader unit and the printer unit, an output copy number designated, and copy job permission information for determining a permission or inhibition of executing the copy job; a second counting step (not shown) of counting the output copy number each time a copy job requested by each client identified by the second identification information is executed; a second inhibiting step (not shown) of inhibiting a copy job requested by each client in accordance with the copy job permission information stored in the second memory; a second transmitting step (not shown), responsive to a request for the output copy number from the second server, of transmitting the output copy number for each piece of the second identification information stored in the second memory; and a second changing step (not shown) of changing a permission state of the copy job permission information stored in the second memory to an inhibition state of the copy job permission information, in accordance with an inhibition request received from the second server. Accordingly, when the image input/output device having the printer unit and scanner unit capable of outputting both a print job and a copy job is connected to the network, the output copy number of each user is managed, and the output copy number managed for each user is transmitted in response to a request from the second server. If the total sum of the transmitted output copy number and the output print number obtained by the second server exceeds a predetermined limit output value, in accordance with the inhibition request supplied from the second server, a permission state of copy job inhibition information stored in the second memory is changed to an inhibition state, irrespective of whether or not a user has a small print output number and a large copy output number or vice versa. In this manner, a transmission of the copy job by a user exceeding the output limit value can be reliably limited.

In the data management method for an image processing system having a first server (print server 100) for storing and managing a print job requested by a client and received via a predetermined communication medium, an image input/output device 200 having a printer unit for receiving the print job stored in the first server via the predetermined communication medium and outputting image data or outputting image data supplied from a reader unit, and a second server (department manage server 300) capable of communicating with the first server and the image input/output device via the predetermined communication medium, or in the storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method or program comprises: a third storing step (Steps (1) to (4) shown in FIG. 5) of storing correspondence information of the first identification information supplied from the first server and the second identification information supplied from the image input/output device; a requesting step (Steps (7) and (10) shown in FIG. 5) of requesting to fetch the output print number from the first server and the output copy number from the image input/output device; a fourth storing step (Steps (12) to (14) shown in FIG. 5) of totalling and storing in a fourth memory for each piece of the identification information, the output print number supplied from the first server and the output copy number supplied from the image input/output device in response to the request by the requesting step; and a notifying step (Steps (19) to (25) shown in FIG. 6) of notifying the first server and the image input/output device of an inhibition request for inhibiting the print job and the copy job, in accordance with a limit output number set for each piece of the identification information and stored in the fourth memory. Accordingly, when the image input/output device having the printer unit and scanner unit capable of outputting both a print job and a copy job is connected to the network, the output copy and print numbers of each user are fetched and managed, and the total sum of the print number transmitted from the first server and the copy number transmitted from the image input/output device for each identified user is calculated. If the calculated total sum exceeds a predetermined limit output value, an inhibition request for inhibiting both the operations of the first server and image input/output device is transmitted immediately at a proper timing. It is therefore possible to change the operation state of the first server and image input/output device to an inhibition state of the print and copy jobs requested by the inhibited user.

Next, the configuration of data processing programs readable by the image processing system of the embodiment will be described with reference to the memory map shown in FIG. 7.

FIG. 7 shows the memory map of a storage medium (memory medium) for storing various data processing programs readable by the image processing system of the embodiment.

Although not specifically shown in the drawing, the storage medium may store information for managing the program group stored in the storage medium, the information including version information, program writer information, and information dependent upon a program reading OS such as icons for discriminating between programs.

Data belonging to each program is managed by directories of the storage medium. The storage medium may also store a program for installing various data processing programs, a program for melting a compressed program to be installed, and the like.

The functions of the embodiment illustrated in FIGS. 5 and 6 may be realized by a host computer which executes an externally installed program. In this case, the invention is also applicable to the case wherein an output device is supplied with information including programs from a storage medium such as a CD-ROM, a flash memory, and an FD or an external storage medium via the network.

Obviously, the objects of the invention can be achieved by supplying a storage medium storing software program codes realizing the functions of the embodiments to a system or an apparatus whose computer (CPU or MPU) reads and executes the software program codes.

In this case, the software program codes themselves read from the storage medium realize the novel embodiment functions of the invention. Therefore, the storage medium storing the program codes constitutes the present invention.

The storage medium storing such program codes may be a floppy disk, a hard disk, an optical disk, a photomagnetic disk, a CD-ROM, a magnetic tape, a non-volatile memory card, a ROM, and an EEPROM.

Obviously, not only the embodiment functions are realized by executing the program codes read by the computer but also the embodiment functions are realized by the program codes used with an OS (operating system) on which the computer runs to execute part or the whole of the actual tasks for realizing the embodiment functions.

Furthermore, the scope of the invention also includes obviously the case wherein in accordance with program codes stored in a memory of a function expansion board or unit connected to the computer supplied with the program codes, a CPU or the like of the function board or unit executes part or the whole of the actual tasks for realizing the embodiment functions.

As described above, according to the embodiment, the image processing system comprises: a first server for storing and managing a print job requested by a client and received via a predetermined communication medium; an image input/output device having a printer unit for receiving the print job stored in the first server via the predetermined communication medium and outputting image data or outputting image data supplied from a reader unit; and a second server for totalling and managing a print output number of the first server and a copy output number of the image input/output device through communications with the first server and the image input/output device via the predetermined communication medium, and inhibiting a use of the first server and the image input/output device in accordance with a total sum obtained through totalling by the second server. Accordingly, the desired network environment can be configured which can reliably inhibit the use of the print and copy job functions in accordance with the total sum of print and copy outputs of each user, when the image input/output device having the printer unit and scanner unit capable of outputting both a print job and a copy job is connected to the network.

In this embodiment, in the image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the first server comprises: first storage means for storing first identification information for identifying a client requested a print job, an output print number designated by the print job, and print job permission information for determining a permission or inhibition of executing the print job; first count means for counting the output print number each time a print job requested by each client identified by the first identification information is executed; first inhibition means for inhibiting a transmission of a print job requested by each client in accordance with the print job permission information stored in the first storage means; first transmission means, responsive to a request for the output print number from the second server, for transmitting the output print number for each piece of the first identification information stored in the first storage means; and print control means for changing a permission state of the print job permission information stored in the first storage means to an inhibition state of the permission information, in accordance with an inhibition request received from the second server; the image input/output device comprises: second storage means for storing second identification information for identifying a client requested a copy job by the reader unit and the printer unit, an output copy number designated, and copy job permission information for determining a permission or inhibition of executing the copy job; second count means for counting the output copy number each time a copy job requested by each client identified by the second identification information is executed; second inhibition means for inhibiting a copy job requested by each client in accordance with the copy job permission information stored in the second storage means; second transmission means, responsive to a request for the output copy number from the second server, for transmitting the output copy number for each piece of the second identification information stored in the second storage means; copy control means for changing a permission state of the copy job permission information stored in the second storage means to an inhibition state of the copy job permission information, in accordance with an inhibition request received from the second server; and the second server comprises: third storage means for storing correspondence information of the first identification information supplied from the first server and the second identification information supplied from the image input/output device; request means for requesting to fetch the output print number from the first server and the output copy number from the image input/output device; fourth storage means for totalling and storing for each piece of the identification information, the output print number supplied from the first server and the output copy number supplied from the image input/output device in response to the request by the request means; and notifying means for notifying the first server and the image input/output device of an inhibition request for inhibiting the print job and the copy job, in accordance with a limit output number set for each piece of the identification information and stored in the fourth storage means. Accordingly, the desired network environment can be configured which can reliably manage the use state of each user by fetching the output print and copy numbers, reliably manage the state that the total sum of the print and copy outputs exceeds the predetermined limit output value, and reliably inhibit the use of the print and copy job functions in accordance with the total sum of print and copy outputs of each user, when the image input/output device having the printer unit and scanner unit capable of outputting both a print job and a copy job is connected to the network.

In this embodiment, the first transmitting means transmits the received print job to the image input/output device, if the user requested the print job is coincident with the stored identification information. Accordingly, a user different from a specific user allowed to use the print function can be reliably prevented from using the print function.

In this embodiment, a copy operation by the reader unit and the printer unit is permitted to be executed, if the user requested the copy job is coincident with the stored identification information. Accordingly, a user different from a specific user allowed to use the copy function can be reliably prevented from using the copy function.

In this embodiment, in the data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, or in the storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method or program comprises: a first storing step of storing in a first memory first identification information for identifying a client requested a print job, an output print number designated by the print job, and print job permission information for determining a permission or inhibition of executing the print job; a first counting step of counting the output print number each time a print job requested by each client identified by the first identification information is executed; a first inhibiting step of inhibiting a transmission of a print job requested by each client in accordance with the print job permission information stored in the first memory; a first transmitting step, responsive to a request for the output print number from the second server, of transmitting the output print number for each piece of the first identification information stored in the first memory; and a first changing step of changing a permission state of the print job permission information stored in the first memory to an inhibition state of the permission information, in accordance with an inhibition request received from the second server. Accordingly, when the image input/output device having the printer unit and scanner unit capable of outputting both a print job and a copy job is connected to the network, the output print number of each user is managed, and the output print number managed for each user is transmitted in response to a request from the second server. If the total sum of the transmitted output print number and the output copy number obtained by the second server exceeds a predetermined limit output value, in accordance with the inhibition request supplied from the second server, a permission state of print job inhibition information stored in the first memory is changed to an inhibition state, irrespective of whether or not a user has a small print output number and a large copy output number or vice versa. In this manner, a transmission of the print job by a user exceeding the output limit value can be reliably limited.

In this embodiment, in the data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, or in the storage medium storing a program readable by a computer which controls an image processing system having a first server for storing and managing a print job requested by a client and received via a predetermined communication medium, an image input/ output device having a printer unit for receiving the print job stored in the first server via the predetermined communication medium and outputting image data or outputting image data supplied from a reader unit, and a second server capable of communicating with the first server and the image input/ output device via the predetermined communication medium, the method or program comprises: a second storing step of storing in a second memory second identification information for identifying a client requested a copy job by the reader unit and the printer unit, an output copy number designated, and copy job permission information for determining a permission or inhibition of executing the copy job; a second counting step of counting the output copy number each time a copy job requested by each client identified by the second identification information is executed; a second inhibiting step of inhibiting a copy job requested by each client in accordance with the copy job permission information stored in the second memory; a second transmitting step, responsive to a request for the output copy number from the second server, of transmitting the output copy number for each piece of the second identification information stored in the second memory; and a second changing step of changing a permission state of the copy job permission information stored in the second memory to an inhibition state of the copy job permission information, in accordance with an inhibition request received from the second server. Accordingly, when the image input/output device having the printer unit and scanner unit capable of outputting both a print job and a copy job is connected to the network, the output copy number of each user is managed, and the output copy number managed for each user is transmitted in response to a request from the second server. If the total sum of the transmitted output copy number and the output print number obtained by the second server exceeds a predetermined limit output value, in accordance with the inhibition request supplied from the second server, a permission state of copy job inhibition information stored in the second memory is changed to an inhibition state, irrespective of whether or not a user has a small print output number and a large copy output number or vice versa. In this manner, a transmission of the copy job by a user exceeding the output limit value can be reliably limited.

In this embodiment, in the data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, or in the storage medium storing a program readable by a computer which controls an image . processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method or program comprises: a third storing step of storing correspondence information of the first identification information supplied from the first server and the second identification information supplied from the image input/output device; a requesting step of requesting to fetch the output print number from the first server and the output copy number from the image input/output device; a fourth storing step of totalling and storing in a fourth memory for each piece of the identification information, the output print number supplied from the first server and the output copy number supplied from the image input/output device in response to the request by the requesting step; and a notifying step of notifying the first server and the image input/output device of an inhibition request for inhibiting the print job and the copy job, in accordance with a limit output number set for each piece of the identification information and stored in the fourth memory. Accordingly, when the image input/output device having the printer unit and scanner unit capable of outputting both a print job and a copy job is connected to the network, the output copy and print numbers of each user are fetched and managed, and the total sum of the print number transmitted from the first server and the copy number transmitted from the image input/output device for each identified user is calculated. If the calculated total sum exceeds a predetermined limit output value, an inhibition request for inhibiting both the operations of the first server and image input/output device is transmitted immediately at a proper timing. It is therefore possible to change the operation state of the first server and image input/output device to an inhibition state of the print and copy jobs requested by the inhibited user.

Therefore, the output print and copy numbers for each identified user can be managed as the total sum thereof. In accordance with the inhibition request supplied from the second server, a permission state of copy job inhibition information stored in the second memory is changed to an inhibition state, irrespective of whether or not a user has a small print output number and a large copy output number or vice versa. In this manner, a desired network environment can be configured which can reliably limit the copy job requested by a user exceeding the output limit value.

What is claimed is:

1. An image forming system having a print server for using a composite function image forming apparatus having a composite function of outputting a print job and a copy job, as a common output apparatus for print jobs requested by client users on a network and received from the network, wherein:

said composite function image forming apparatus has a copy job output number management function of receiving a copy job related to image data input from a reader unit requested by each client user assigned a specific copy job management identification number, outputting the received copy job, and managing the number of copy outputs of the copy job in correspondence with the copy job management identification number;

said print server has a print job output number management function of receiving from the network a print job requested by each client user assigned a specific print job management identification number, instructing said composite function image forming apparatus to print out the received print job, and managing the number of print outputs of the print job in correspondence with the print job management identification number; and a totaling apparatus is provided on the network, the totaling apparatus comprising:

storage means for storing user data in a correspondence format of the copy job management identification number and the print job management identification number; and user discriminating means for discriminating same client users having both a specific copy job management identification number and a specific print job management identification number by referring to the user data stored in said storage means, wherein said totaling apparatus fetches via the network the output number managed by the copy job output number management function of said composite function image forming apparatus in correspondence with the copy job management identification number and the output number managed by the print job output number management function of said print server in correspondence with the print job management identification number, and totals the output number of the same user by adding the output number of copy jobs to the output number of print jobs for each client user discriminated as the same user by said user discriminating means.

2. An image forming system according to claim 1, wherein:

said totaling apparatus transmits a request instruction to said composite function image forming apparatus via the network, the request instruction fetching the output number managed by the copy job output number management function of said composite function image forming apparatus in correspondence with the copy job management identification number, and transmits a request instruction to said print server via the network, the request instruction fetching the output number managed by the print job output number management function of said print server in correspondence with the print job management identification number;

said composite image forming apparatus responsive to the request instruction from said totaling apparatus transmits over the network the output number managed by the copy job output number management function; and said print server responsive to the request instruction from said totaling apparatus transmits over the network the output number managed by the print job output number management function.

3. An image forming system according to claim 2, wherein:

said composite function image forming apparatus comprises copy job output number storage means for storing the output number of copy jobs in correspondence with each copy job management identification number, copy job management identification number storage means for storing the copy job management identification number, input means for inputting the copy job management identification number of a client user requested a copy job, comparison means for comparing the copy job management identification number entered by said input means with the copy job management identification number stored in said copy job management identification number storage means, and count means for counting the output number when the copy job requested by the client user is output;

if a comparison result by said comparison means indicates that the input copy job management identification number is coincident with the stored copy job management identification number, said composite function image forming apparatus adds the output number counted by said count means to the output number stored in said copy job output number storage means in correspondence with the coincident copy job management identification number to update the output number stored in said copy job output number storage means so as to have an addition result, and in response to the request instruction from said totaling apparatus, said composite function image forming apparatus transmits via the network to said totaling apparatus the output number stored in said copy job output number storage means and the corresponding copy job management identification number.

4. An image forming system according to claim 3, wherein if a comparison result by said comparison means indicates that the input copy job management identification number is not coincident with the stored copy job management identification number, said composite function image forming apparatus inhibits an output of the requested copy job.

5. An image forming system according to claim 2 or 3, wherein:

said print server comprises print job output number storage means for storing the output number of print jobs in correspondence with each print job management identification number, print job management identification number storage means for storing the print job management identification number, input means for inputting the print job management identification number of a client user requested a print job, comparison means for comparing the print job management identification number entered by said input means with the print job management identification number stored in said print job management identification number storage means, and count means for counting the output number of the print job requested by the client user;

if a comparison result by said comparison means indicates that the input print job management identification number is coincident with the stored print job management identification number, said print server adds the output number counted by said count means to the output number stored in said print job output number storage means in correspondence with the coincident print job management identification number to update the output number stored in said print job output number storage means so as to have an addition result, and in response to the request instruction from said totaling apparatus, said print server transmits via the network to said totaling apparatus the output number stored in said print job output number storage means and the corresponding print job management identification number.

6. An image forming system according to claim 5, wherein if a comparison result by said comparison means indicates that the input print job management identification number is not coincident with the stored print job management identification number, said print server inhibits an output of the requested print job.

7. An output number management method of managing an output number of a print job and an output number of a copy job for an image forming system having a print server for using a composite function image forming apparatus having a composite function of outputting a print job and a copy job, as a common output apparatus for print jobs requested by client users on a network and received from the network, wherein:

a totaling apparatus is provided on the network, said composite function image forming apparatus receives a copy job related to image data input from a reader unit requested by each client user assigned a specific copy job management identification number, outputs the received copy job, and manages the number of copy outputs of the copy job in correspondence with the copy job management identification number;

said print server receives from the network a print job requested by each client user assigned a specific print job management identification number, instructs said composite function image forming apparatus to print out the received print job, and manages the number of print outputs of the print job in correspondence with the print job management identification number; and said totaling apparatus stores in storage means user data in a correspondence format of the copy job management identification number and the print job management identification number, discriminates same client users having both a specific copy job management identification number and a specific print job management identification number by referring to the user data stored in the storage means, wherein the totaling apparatus fetches via the network the output number managed by the composite function image forming apparatus in correspondence with the copy job management identification number and the output number managed by the print server in correspondence with the print job management identification number, and totals the output number of the same user by adding the output number of copy jobs to the output number of print jobs for each client user discriminated as the same user in accordance with a discrimination result.

8. An output number management method for an image forming system according to claim 7, wherein:

said totaling apparatus transmits a request instruction to said composite function image forming apparatus via the network, the request instruction fetching the output number managed by said composite function image forming apparatus in correspondence with the copy job management identification number, and transmits a request instruction to said print server via the network, the request instruction fetching the output number managed by said print server in correspondence with the print job management identification number;

said composite image forming apparatus responsive to the request instruction from said totaling apparatus transmits over the network the managed output number; and said print server responsive to the request instruction from said totaling apparatus transmits over the network the managed output number.

9. A storage medium storing a program for configuring on an image forming system an output number management system for managing an output number of a print job and an output number of a copy job, the image forming system including a composite function image forming apparatus with a composite function of outputting the print job and the copy job and a print server, the composite function image forming apparatus having a copy job output number management function of receiving a copy job related to image data input from a reader unit requested by each client user assigned a specific copy job management identification number, outputting the received copy job, and managing the number of copy outputs of the copy job in correspondence with the copy job management identification number, the print server having a print job output number management function of receiving from the network a print job requested by each client user assigned a specific print job management identification number, instructing said composite function image forming apparatus to print out the received print job, and managing the number of print outputs of the print job in correspondence with the print job management identification number, said program being executable by an information processing apparatus provided on the network and comprising:

- a storage module for storing user data in a correspondence format of the copy job management identification number and the print job management identification number;
- a user discriminating module for discriminating same client users having both a specific copy job management identification number and a specific print job management identification number by referring to the user data stored in said storage module;
- a fetch control module for controlling to fetch via the network the output number managed by the copy job output number management function of the composite function image forming apparatus in correspondence with the copy job management identification number and the output number managed by the print job output number management function of the print server in correspondence with the print job management identification number; and
- a totaling module for totaling the output number of the same user by adding the output number of copy jobs to the output number of print jobs for each client user discriminated as the same user in accordance with a discrimination result by said user discriminating module.

10. A storage medium according to claim 9, wherein:

said fetch control module performs a request instruction process of transmitting a request instruction to the composite function image forming apparatus via the network, the request instruction fetching the output number managed by the copy job output number management function of the composite function image forming apparatus in correspondence with the copy job management identification number, and transmitting a request instruction to the print server via the network, the request instruction fetching the output number managed by the print job output number management function of the print server in correspondence with the print job management identification number.

11. An image processing system comprising:

- a first server for storing and managing a print job requested by a client and received via a predetermined communication medium;
- an image input/output device having a printer unit for receiving the print job stored in said first server via the predetermined communication medium and outputting image data or outputting image data supplied from a reader unit; and
- a second server for totaling and managing the output number of the same user by adding a print output number of said first server to a copy output number of said image input/output device through communications with said first server and said image input/output device via the predetermined communication medium, and inhibiting a use of said first server and said image input/output device in accordance with the output number obtained through totaling by said second server.

12. An image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium wherein:

said first server comprises:
- first storage means for storing first identification information for identifying a client requested a print job, an output print number designated by the print job, and print job permission information for determining a permission or inhibition of executing the print job;
- first count means for counting the output print number each time a print job requested by each client identified by the first identification information is executed;
- first inhibition means for inhibiting a transmission of a print job requested by each client in accordance with the print job permission information stored in said first storage means;
- first transmission means, responsive to a request for the output print number from said second server, for transmitting the output print number for each piece of the first identification information stored in said first storage means; and
- print control means for changing a permission state of the print job permission information stored in said first storage means to an inhibition state of the permission information, in accordance with an inhibition request received from said second server;

said image input/output device comprises:
- second storage means for storing second identification information for identifying a client requested a copy job by the reader unit and the printer unit, an output copy number designated, and copy job permission information for determining a permission or inhibition of executing the copy job;
- second count means for counting the output copy number each time a copy job requested by each client identified by the second identification information is executed;
- second inhibition means for inhibiting a copy job requested by each client in accordance with the copy job permission information stored in said second storage means;

second transmission means, responsive to a request for the output copy number from said second server, for transmitting the output copy number for each piece of the second identification information stored in said second storage means; and copy control means for changing a permission state of the copy job permission information stored in said second storage means to an inhibition state of the copy job permission information, in accordance with an inhibition request received from said second server; and said second server comprises:

third storage means for storing correspondence information of the first identification information supplied from said first server and the second identification information supplied from said image input/output device;

request means for requesting to fetch the output print number from said first server and the output copy number from said image input/output device;

fourth storage means for totaling and storing for each piece of the output number of the same user who has both the first identification information and second identification information by adding the output print number supplied from said first server and the output copy number supplied from said image input/output device in response to the request by said request means; and notifying means for notifying said first server and said image input/output device of an inhibition request for inhibiting the print job and the copy job, in accordance with a limit output number set for each piece of the same user and stored in said fourth storage means.

13. An image processing system according to claim 12, wherein said first transmission means transmits the received print job to said image input/output device if the client requested the print job is coincident with the stored first identification information.

14. An image processing system according to claim 12, wherein the copy job by the reader unit and the printer unit is permitted to be executed, if the client requested the copy job is coincident with the stored second identification information.

15. A data management method for an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the method comprising:

a first storing step of storing user correspondence information of first user identification information supplied from the first server and second user identification information supplied from the image input/output device;

a requesting step of requesting to fetch an output print number from the first server and an output copy number from the image input/output device;

a second storing step of totaling and storing in a memory for each piece of the output number of a same user who has both the first identification information and second identification information by adding the output print number supplied from the first server and the output copy number supplied from the image input/output device in response to the request by said requesting step; and a notifying step of notifying the first server and the image input/output device of an inhibition request for inhibiting the print job and the copy job, in accordance with a limit output number set for each piece of the same user and stored in the memory.

16. A storage medium storing a program readable by a computer which controls an image processing system having a first server for storing and managing a print job requested by a client and received via a predetermined communication medium, an image input/output device having a printer unit for receiving the print job stored in the first server via the predetermined communication medium and outputting image data or outputting image data supplied from a reader unit, and a second server capable of communicating with the first server and the image input/output device via the predetermined communication medium, the program comprising:

a first storing step of storing user correspondence information of first user identification information supplied from the first server and second user identification information supplied from the image input/output device;

a requesting step of requesting to fetch an output print number from the first server and an output copy number from the image input/output device;

a second storing step of totaling and storing in a memory for each piece of the output number of the same user who has both the first identification information and the second identification information by adding the output print number supplied from the first server and the output copy number supplied from the image input/output device in response to the request by said requesting step; and a notifying step of notifying the first server and the image input/output device of an inhibition request for inhibiting the print job and the copy job, in accordance with a limit output number set for each piece of the same user and stored in the memory.

17. A data management method for managing the output number of input image data at a predetermined output destination, said method comprising:

a first management step of managing an output number of each user for a first job type related to image data input from a reader unit;

a second management step of managing an output number of each user for a second job type related to image data input from a predetermined communication medium; and a totaling step of totaling an output number of a same user by adding the output number of the first job type to the output number of the second job type of the same user, when the user of the first output job type is the same as the user of the second output job type.

18. A data management method according to claim 17, wherein said data management method further comprises an inhibition step of inhibiting the same user from outputting the image data to the destination, when the totaled output number is more than a predetermined number.

19. A data management method according to claim 17, wherein the predetermined output destination is a printer unit.

20. A data management method according to claim 19, wherein the output number is managed in units of output modes of the printer unit.

21. A data management method according to claim 19, wherein the reader unit and the printer unit compose an image input/output apparatus, the image data input from the communication medium is transmitted to the image input/output apparatus via a print server, and the output number of the same user is totaled in a department manage server connected with the image input/output apparatus and the print server via the communication medium.

22. An image processing system for outputting input data at a predetermined output destination, said system, comprising:
- first management means for managing an output number of each of user related to image data input from a reader unit;
- second management means for managing an output number of each of user related to image data input from a predetermined communication medium; and
- totaling means for totaling an output number of a same user by adding a number of a first output job type to a number of a second output job type of the same user, when the user of the first output job type is the same as the user of the second output job type.

23. A storage medium storing a program readable by a computer which implements a data management method for managing the output number of input image data at a predetermined output destination, said program comprising:
- a first management step of managing an output number of each of user related to image data input from a reader unit;
- a second management step of managing an output number of each of user related to image data input from a predetermined communication medium; and
- a totaling step of totaling an output number of a same user by adding a number of a first output job type to a number of a second output job type of the same user, when the user of the first output job type is the same as the user of the second output job type.

24. A data management method for outputting image data of a job related to a predetermined input source at an image output apparatus, said data management method comprising:
- a first control step of controlling first image data of a first job type related to a predetermined input source to be output at the image output apparatus;
- a second control step of controlling second image data of a second job type related to a predetermined input source to be output at the image output apparatus;
- a first management step of managing a total sum of an output number of the first image data finished being controlled to be output in said first control step in units of a user;
- a second management step of managing a total sum of an output number of the second image data finished being controlled to be output in said second control step in units of a user; and
- a totaling step of totaling a total sum of a same user by adding the total sum of the output number of the first image data to the total sum of the output number of the second image data, when the same user managed in both said first management step and said second management step exists.

25. A data management method according to claim 24, wherein said data management method further comprises an inhibition step of inhibiting the same user from outputting the image data at the image output apparatus, when the totaled output number is more than a predetermined number.

26. A data management method according to claim 24, wherein the image output apparatus is a printer unit.

27. An image processing system including an image output apparatus at which image data of a job related to a predetermined input source is output, said image processing system comprising:
- first control means for controlling first image data of a first job type related to a predetermined input source to be output at the image output apparatus;
- second control means for controlling second image data of a second job type related to a predetermined input source to be output at the image output apparatus;
- first management means for managing a total sum of an output number of the first image data finished being controlled to be output by said first control means in units of a user;
- second management means for managing a total sum of an output number of the second image data finished being controlled to be output by said second control means in units of a user; and
- totaling means for totaling a total sum of a same user by adding the total sum of the output number of the first image data to the total sum of the output number of the second image data, when the same user managed by both said first management means and said second management means exists.

28. A storage medium storing a program readable by a computer which implements a data management method for outputting image data of a job related to a predetermined input source at an image output apparatus, said program comprising:
- a first control step of controlling first image data of a first job type related to a predetermined input source to be output at the image output apparatus;
- a second control step of controlling second image data of a second job type related to a predetermined input source to be output at the image output apparatus;
- a first management step of managing a total sum of an output number of the first image data finished being controlled to be output in said first control step in units of a user;
- a second management step of managing a total sum of an output number of the second image data finished being controlled to be output in said second control step in units of a user; and
- a totaling step of totaling a total sum of a same user by adding the total sum of the output number of the first image data to the total sum of the output number of the second image data, when the same user managed in both said first management step and said second management step exists.

* * * * *

UNITED STATES PATENT AND TRADEMARK OFFICE
CERTIFICATE OF CORRECTION

PATENT NO. : 6,597,469 B1
DATED : July 22, 2003
INVENTOR(S) : Kuroyanagi

It is certified that error appears in the above-identified patent and that said Letters Patent is hereby corrected as shown below:

Drawings,
Sheet 10, Fig. 6, in block (19), "SERARCH DEPARTMENTAL COUNTER TABLE AND CALCULATE" should read -- SEARCH DEPARTMENTAL COUNTER TABLE AND CALCULATE --.

Column 31,
Line 14, "image." should read -- image --.

Signed and Sealed this

Fourth Day of January, 2005

JON W. DUDAS
*Director of the United States Patent and Trademark Office*